(12) United States Patent
Piao et al.

(10) Patent No.: US 10,235,564 B2
(45) Date of Patent: Mar. 19, 2019

(54) DELIVERY HANDLING APPARATUS, DELIVERY HANDLING METHOD, AND DELIVERY HANDLING PROGRAM

(71) Applicant: Kabushiki Kaisha Toshiba, Minato-ku (JP)

(72) Inventors: Ying Piao, Tokyo (JP); Tomoyuki Hamamura, Tokyo (JP); Bunpei Irie, Kawasaki (JP); Masaya Maeda, Kawasaki (JP); Yasuhiro Ohkawa, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 15/625,345

(22) Filed: Jun. 16, 2017

(65) Prior Publication Data

US 2017/0364745 A1    Dec. 21, 2017

(30) Foreign Application Priority Data

Jun. 16, 2016  (JP) .................................. 2016-120154
Jun. 12, 2017  (JP) .................................. 2017-115139

(51) Int. Cl.
*G06K 9/00* (2006.01)
*B07C 3/14* (2006.01)
*B07C 3/00* (2006.01)

(52) U.S. Cl.
CPC ............ *G06K 9/00469* (2013.01); *B07C 3/00* (2013.01); *B07C 3/14* (2013.01); *G06K 9/00442* (2013.01); *G06K 9/00456* (2013.01)

(58) Field of Classification Search
None
See application file for complete search history.

(56) References Cited

U.S. PATENT DOCUMENTS 6,360,001 B1 * 3/2002 Berger ................. G06K 9/2054
                                                          382/101
8,526,743 B1 * 9/2013 Campbell ............ G06K 9/6202
                                                          382/181

(Continued)

FOREIGN PATENT DOCUMENTS

| EP | 2 367 141 A2 | 9/2011 |
| JP | 2014-182618 | 9/2014 |
| WO | WO 2006/074123 A2 | 7/2006 |

OTHER PUBLICATIONS

Extended European Search Report dated Nov. 8, 2017 in Patent Application No. 17175958.2, 8 pages.

*Primary Examiner* — Soo Jin Park
(74) *Attorney, Agent, or Firm* — Oblon, McClelland, Maier & Neustadt, L.L.P.

(57) ABSTRACT

According to one embodiment, a delivery handling apparatus includes a recognition portion which performs an image recognition processing to an image imaged by an imaging portion to image a delivery object, to recognize information including an address given to the delivery object and a parameter selecting portion which sequentially selects parameter sets from a plurality of the parameter sets previously stored in a storage portion and a control portion which makes the parameter selecting portion sequentially select parameter sets from a plurality of the parameter sets, and the recognition portion perform an image recognition processing to an image with the parameter sets selected by the parameter selecting portion, and the parameter selecting portion select the parameter set satisfying a prescribed condition, based on a result of the image recognition processing corresponding to the respective parameter sets.

6 Claims, 16 Drawing Sheets

(56) References Cited

U.S. PATENT DOCUMENTS

| | | | |
|---|---|---|---|
| 8,955,688 B2* | 2/2015 | Berdelle-Hilge | B07C 3/02 |
| | | | 198/465.4 |
| 9,350,552 B2* | 5/2016 | Elmenhurst | G06K 9/3216 |
| 9,905,056 B2* | 2/2018 | Bowers | G07B 17/00508 |
| 2006/0204096 A1 | 9/2006 | Takebe et al. | |
| 2006/0291691 A1 | 12/2006 | Laws | |
| 2011/0229018 A1 | 9/2011 | Maeda et al. | |
| 2012/0008824 A1 | 1/2012 | Miette et al. | |
| 2015/0070509 A1* | 3/2015 | Watanabe | G06Q 10/08 |
| | | | 348/184 |

* cited by examiner

| SORTING STACKER | ADDRESS |
|---|---|
| 19E-1 | AAA |
| 19E-2 | BBB |
| 19E-3 | CCC |
| ⋮ | ⋮ |

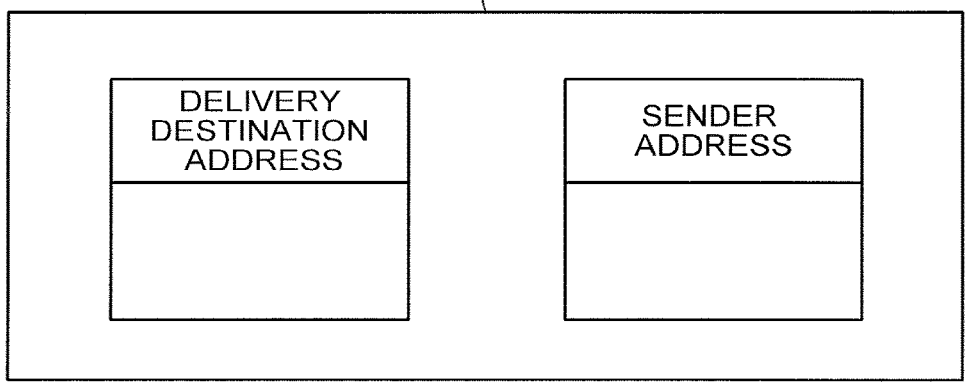
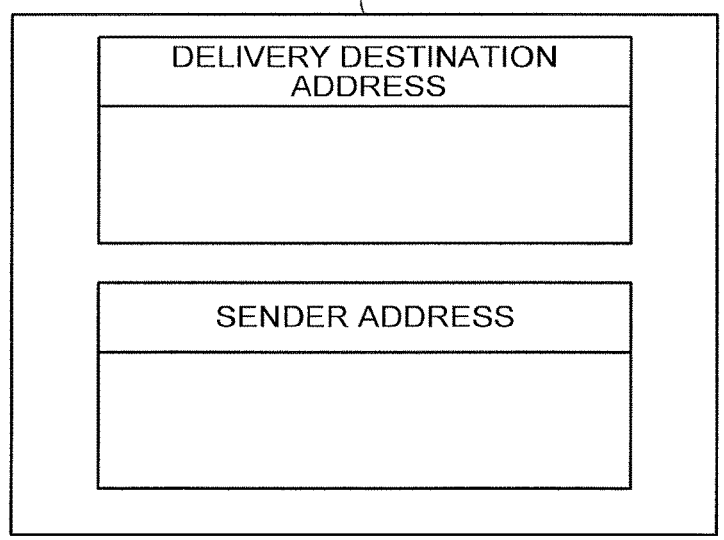
FIG. 7

| 56 | 58 |
|---|---|
| LARGE CUSTOMER FORMAT | PARAMETER SET |
| A COMPANY 1 | PARAMETER SET A1-1 |
| ↓ | PARAMETER SET A1-2 |
| | PARAMETER SET A1-3 |
| A COMPANY 2 | PARAMETER SET A2-1 |
| | PARAMETER SET A2-2 |
| | PARAMETER SET A2-3 |
| | PARAMETER SET A2-4 |
| ↓ | PARAMETER SET A2-5 |
| B COMPANY 1 | PARAMETER SET B1-1 |
| | PARAMETER SET B1-2 |
| | PARAMETER SET B1-3 |
| ↓ | PARAMETER SET B1-4 |

| LARGE CUSTOMER FORMAT OF TESTING LETTER | PARAMETER SET | SORTING RATE INTO SORTING STACKERS | SELECTION |
|---|---|---|---|
| A COMPANY 1 | PARAMETER SET A1-1 | 70% | × |
| ↓ | PARAMETER SET A1-2 | 96% | ○ |
| ↓ | PARAMETER SET A1-3 | 85% | × |
| A COMPANY 2 | PARAMETER SET A2-1 | | |
| ↓ | PARAMETER SET A2-2 | | |
| ↓ | PARAMETER SET A2-3 | | |
| ↓ | PARAMETER SET A2-4 | | |
| ↓ | PARAMETER SET A2-5 | | |
| B COMPANY 1 | PARAMETER SET B1-1 | | |
| ↓ | PARAMETER SET B1-2 | | |
| ↓ | PARAMETER SET B1-3 | | |
| ↓ | PARAMETER SET B1-4 | | |

| DELIVERY OBJECT ID | RIGHT ADDRESS | SORTING STACKER CORRESPONDING TO RIGHT ADDRESS | SORTED SORTING STACKER |
|---|---|---|---|
| 001 | AAA | 01 | 01 |
| 002 | BBB | 02 | 02 |
| 003 | CCC | 03 | 03 |
| 004 | DDD | 04 | 04 |
| 005 | EEE | 05 | 06 |
| ⋮ | ⋮ | ⋮ | ⋮ |

FIG. 10

| LARGE CUSTOMER FORMAT OF TESTING LETTER | PARAMETER SET | SORTING RATE INTO SORTING STACKERS CORRESPONDING TO RIGHT ADDRESSES | SELECTION |
|---|---|---|---|
| A COMPANY 1 | PARAMETER SET A1-1 | 65% | × |
| ↓ | PARAMETER SET A1-2 | 90% | ○ |
| ↓ | PARAMETER SET A1-3 | 80% | × |
| A COMPANY 2 | PARAMETER SET A2-1 | | |
| ↓ | PARAMETER SET A2-2 | | |
| ↓ | PARAMETER SET A2-3 | | |
| ↓ | PARAMETER SET A2-4 | | |
| ↓ | PARAMETER SET A2-5 | | |
| B COMPANY 1 | PARAMETER SET B1-1 | | |
| ↓ | PARAMETER SET B1-2 | | |
| ↓ | PARAMETER SET B1-3 | | |
| ↓ | PARAMETER SET B1-4 | | |

| ENVIRONMENTAL FACTOR / FORMAT | LIGHT | INTERMEDIATE | DARK |
|---|---|---|---|
| A COMPANY 1 | PARAMETER SET A1-1 | PARAMETER SET A1-2 | PARAMETER SET A1-3 |
| A COMPANY 2 | PARAMETER SET A2-1 | PARAMETER SET A2-2 | PARAMETER SET A2-3 |
| B COMPANY 1 | PARAMETER SET B1-1 | PARAMETER SET B1-2 | PARAMETER SET B1-3 |

DELIVERY HANDLING APPARATUS, DELIVERY HANDLING METHOD, AND DELIVERY HANDLING PROGRAM

CROSS-REFERENCE TO RELATED APPLICATION

This application is based upon and claims the benefit of priority from the prior Japanese Patent Application No. 2016-120154, filed on Jun. 16, 2016, and the prior Japanese Patent Application No. 2017-115139, filed on Jun. 12, 2017; the entire contents of which are incorporated herein by reference.

FIELD

Embodiments described herein relate generally to a delivery handling apparatus, a delivery handling method, and a delivery handling program.

BACKGROUND

Conventionally, an apparatus which reads information from an image obtained by imaging one of various delivery objects such as a home delivery object, a postcard, an envelope, and identifies an address of the delivery object using the read information is known. In the apparatus like this, there was a case in which an operator manually selects a parameter set to be used for reading the information, in accordance with a state (a format in which an address and so on are described, for example) in which the information is given. However, in the conventional technology, there was a case in which it is necessary for an operator to make a troublesome work, and thereby convenience is not sufficient.

BRIEF DESCRIPTION OF THE DRAWINGS

FIG. 7 is a diagram schematically showing information included in the large customer format 56;

FIG. 8 is a diagram showing an example of the parameter set group 58 stored in the storage portion 50;

FIG. 9 is a diagram showing an example of a result that the image recognition processing has been evaluated;

FIG. 10 is a diagram showing an example of processing result information 62;

FIG. 11 is a diagram showing another example of a result that the image recognition processing has been evaluated;

DETAILED DESCRIPTION

According to one embodiment, there is provided a delivery handling apparatus including a recognition portion which performs an image recognition processing to an image imaged by an imaging portion to image a delivery object, to recognize information including an address given to the delivery object and a parameter selecting portion which sequentially selects parameter sets from a plurality of the parameter sets previously stored in a storage portion and a control portion which makes the parameter selecting portion sequentially select parameter sets from a plurality of the parameter sets, and the recognition portion perform an image recognition processing to an image with the parameter sets selected by the parameter selecting portion, and the parameter selecting portion select the parameter set satisfying a prescribed condition, based on a result of the image recognition processing corresponding to the respective parameter sets.

Hereinafter, delivery handling apparatuses, delivery handling methods, and delivery handling programs of embodiments will be described with reference to the drawings.

First Embodiment

Figure 1:
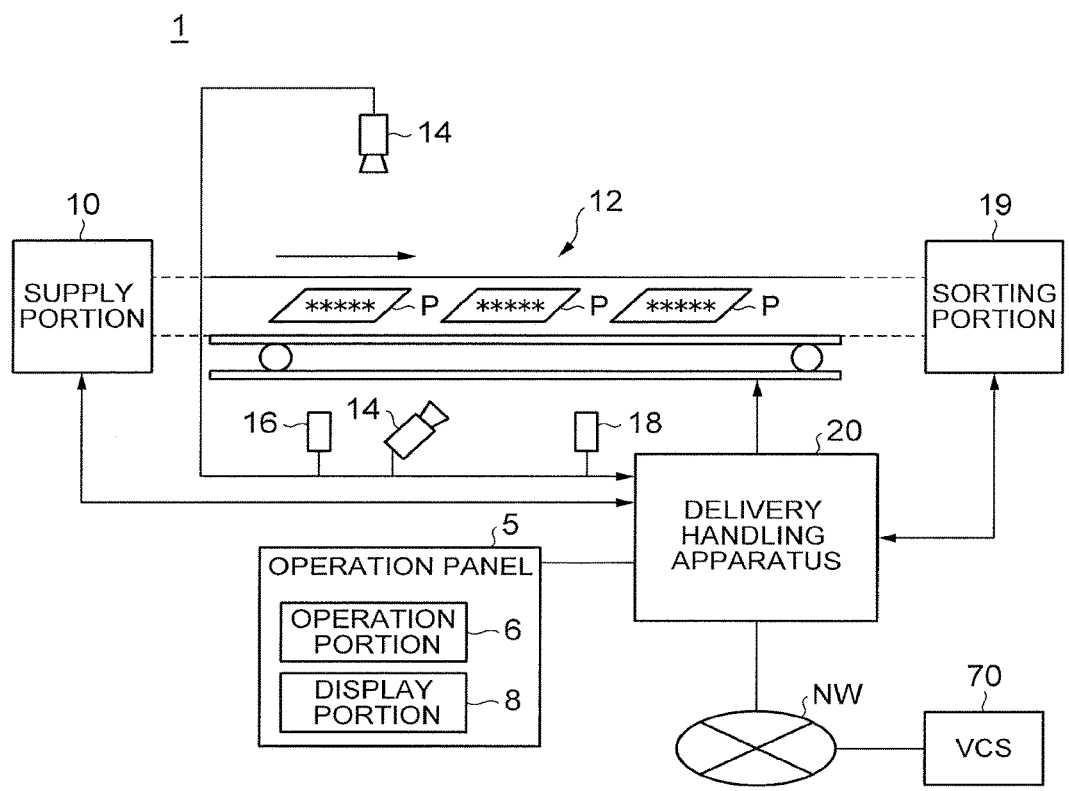
FIG. 1 is a schematic diagram of a delivery handling system 1.

FIG. 1 is a schematic diagram of a delivery handling system 1. The delivery handling system 1 is a system which sorts delivery objects P including a home delivery object, a postcard, an envelope, and so on into sorting places corresponding to delivery destinations thereof. The sorting place is a sorting place (a sorting stacker described later) which is assigned for each of groups obtained by classifying delivery destinations into rough address sections, for example. The delivery handling system 1 images the delivery object P to be conveyed by a conveying structure 12 including a belt conveyor, a holding belt and so on, for example, by an imaging portion 14. In the following description, it is decided that the delivery object P is a letter such as a postcard or an envelope.

A delivery handling apparatus 20 of the delivery handling system 1 recognizes address information given to the delivery object P from an image which has been imaged by the imaging portion 14, and sorts the delivery object P based on the recognized address information. The address information is information indicating an address of a delivery destination of the delivery object P. The address information may include information indicating an address of a sender of the delivery object P, and a so-called narrowly-defined address, and in addition to these, a full mane, a name or the like of the sender.

Hereinafter, a configuration of the delivery handling system 1 will be described individually. For example, the delivery handling system 1 is provided with an operation panel 5, a supply portion 10, the conveying structure 12, the imaging portion 14, a bar code reader (Hereinafter, referred to as "a BCR".) 16, a bar code writer (Hereinafter, referred to as "a BCW".) 18, a sorting portion 19, and the delivery handling apparatus 20. The delivery handling apparatus 20 is connected to a video coding system (Hereinafter, referred to as "a VCS".) via a network NW. The network NW includes a LAN (Local Area Network), a WAN (Wide Area Network), and so on, for example.

The operation panel 5 is provided with an operation portion 6 and a display portion 8. The operation portion 6 is a device which accepts an input operation of information by a user. The operation portion 6 is provided with an input device such as a keyboard, a mouse, a touch panel, and a microphone. The display portion 8 displays an operating state, a processing result, and so on of the delivery handling system 1. The display portion 8 is a display device such as an LCD (Liquid Crystal Display) and an organic EL (Electro Luminescence), for example.

The supply portion 10 is provided at an upstream side of the conveying structure 12. In the supply portion 10, the delivery objects P to be supplied to the conveying structure 12 are set in an overlapped state, for example. The supply portion 10 is provided with rollers (not shown) in contact with the lower ends of the set delivery objects P. The rollers are rotated in a state in which the delivery object P is set in the supply portion 10, and thereby the delivery object P is taken out from the supply portion 10 and is sent to the conveying structure 12.

The conveying structure 12 conveys the delivery object P supplied from the supply portion 10 toward the sorting portion 19. The conveying structure 12 is provided with a drive pulley, a drive motor, and a conveyor belt, for example. The drive pulley is rotated by a driving force outputted by the drive of the drive motor. The conveyor belt operates by the rotation force of the drive pulley, and thereby conveys the delivery object P placed on the belt.

The imaging portion 14 images the delivery object P which has reached an imaging position, and outputs an imaged image to the delivery handling apparatus 20. The imaging portion 14 is provided with a plurality of scanners of a line scan system capable of imaging the moving delivery object P at a high resolution, for example, and lighting. A line image is acquired by the scanner of the line scan system. For example, an image processing portion included in the imaging portion 14 synthesizes the line images by aligning the line images in a short direction thereof, to generate a two-dimensional image. The lighting irradiates the delivery object P to be conveyed by the conveying structure 12 with light. The imaging portion 14 arranges a plurality of the scanners at positions where the delivery object P can be imaged at different angles, for example, and thereby the imaging portion 14 can acquire the line images corresponding to respective surfaces of the delivery object P.

In addition, the imaging portion 14 may be a camera capable of imaging a prescribed plane area at one time, for example, or may be a video camera. In addition, the image processing portion to generate the two-dimensional image may be included in the delivery handling apparatus 20.

The BCR 16 reads information from a bar code given to the delivery object P, and outputs the read information to the delivery handling apparatus 20. Identification information, address information, and so on of the delivery object P are included in the information to be read by the BCR 16. In addition, in the above-described example, it has been described that the BCR 16 reads information from a bar code, but without being limited to a bar code, the delivery handling apparatus 20 may read information from code information such as a QR code (registered trademark).

The BCW 18 prints a bar code on the delivery object P, based on an instruction from the delivery handling apparatus 20. The bar code is printed with an ink which is difficult for a person to visually recognize, for example. The BCW 18 prints a bar code obtained by encoding the address information and the identification information as the recognition result, on the delivery object P from which the address information has been recognized by the delivery handling apparatus 20. In addition, the BCW 18 prints a bar code obtained by encoding the identification information, on the delivery object P in which the recognition of the address information has not been completed.

The VCS 70 is a system which displays the image of the delivery object P from which the address information has not been recognized by the delivery handling apparatus 20 on a display portion of the VCS 70, and thereby aids the recognition of the address information by visual recognition of a person. The delivery handling apparatus 20 holds the correspondence relation between the result of the video coding system and the identification information.

Figure 2:
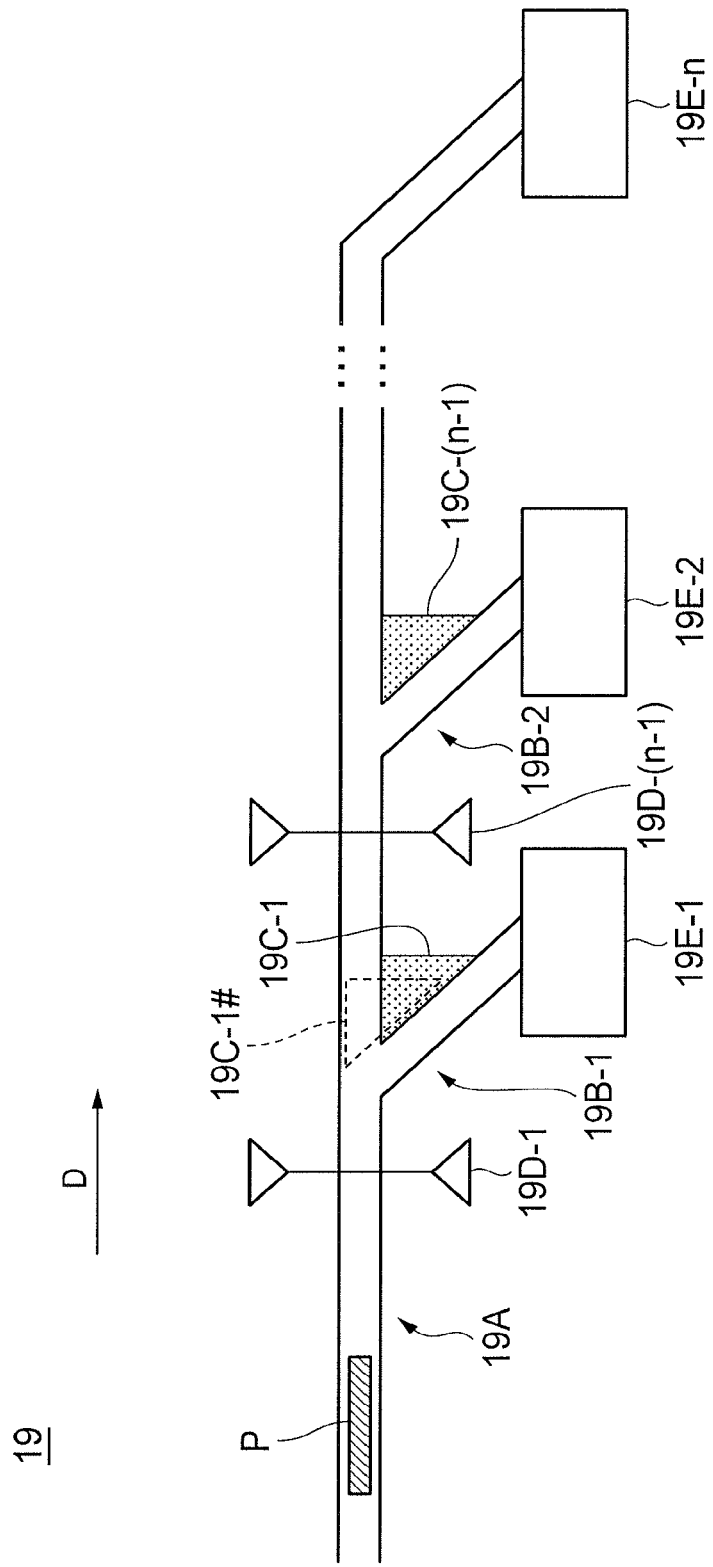
FIG. 2 is a diagram schematically showing the sorting portion 19.

The sorting portion 19 is provided at a downstream side of the conveying structure 12. FIG. 2 is a diagram schematically showing the sorting portion 19. The sorting portion 19 is provided with a conveying structure 19A, accumulating and conveying structures 19B-1 to 19B-n, switching portions 19C-1 to 19C-(n−1), detection sensors 19D-1 to 19D-(n−1), accumulating portions 19E-1 to 19E-n, for example. "n" is an arbitrary natural number. Hereinafter, when the above-described functional configurations are not to be particularly distinguished, they will be described by omitting a numeral character and a symbol after "- (hyphen)".

The conveying structure 19A conveys the delivery object P which has been conveyed by the conveying structure 12 toward the downstream side. The conveying structure 19A is provided with a drive pulley, a drive motor, and a conveyor belt, for example. The accumulating and conveying structure 19B is a conveying structure which branches from the conveying structure 19A. A terminal of the accumulating and conveying structure 19B which branches from the conveying structure 19A is connected to the prescribed accumulating portion 19E. The accumulating and conveying structure 19B conveys the delivery object P which has been conveyed by the conveying structure 19A toward the accumulating portion 19E.

The switching portion 19C is arranged at a branching point where the accumulating and conveying structure 19B branches from the conveying structure 19A. The switching portion 19C is controlled to be in an ON state or an OFF state by the control of a conveyance control portion 34 (described later). The OFF state is a state (19C-1, in the drawing) in which the switching portion 19C is located at an initial position, and the delivery object P which has been conveyed from the conveying structure 19A is conveyed without change (toward a D direction, in the drawing). That is, the OFF state is a state in which the delivery object P is not branched to the accumulating and conveying structure 19B.

On the contrary, the ON state is a state (19C-1#, in the drawing) in which the delivery object P which has been conveyed from the conveying structure 19A is conveyed to the accumulating and conveying structure 19B. In addition, when all of the switching portions 19C are not controlled to be in an ON state, the delivery object P is accumulated in the accumulating portion 19E-n connected to the terminal of the conveying structure 19A.

The detection sensor 19D is provided on the conveying structure 19A, and at an upstream side of the branching point where the accumulating and conveying structure 19B branches from the conveying structure 19A. The detection sensor 19D detects presence or absence of the delivery object P using an optical method, for example.

The accumulating portion 19E includes a plurality of sorting stackers which are partitioned into a plurality of stages and a plurality of columns, a reject stacker, a VCS stacker, and so on. For example, the accumulating portions 19E-1 and 19E-2, the accumulating portion 19E-n, the accumulating portion 19E-(n−1) (not shown) are defined respectively as the sorting stackers, the reject stacker, the VCS stacker. The reject stacker, the VCS stacker or the like is one example of a place different from the sorting place.

The delivery object P corresponding to a sorting destination instructed based on an instruction of the delivery handling apparatus 20 is conveyed and accumulated in a sorting stacker. The delivery object P in which a sorting destination has not been specified is accumulated in the reject stacker. The delivery object P to which an off-line video coding has been performed is accumulated in the VCS stacker. The delivery object P accumulated in the VCS stacker is set at the supply portion 10 again. In this case, a sorting stacker of a conveying destination is judged by the bar code which has been printed by the above-described BCW 18 and the processing result of the VCS 70.

Not only "the off-line video coding" like this that is a processing to perform a video coding to the delivery object P which has been conveyed to the sorting portion 19 once, "an on-line video coding" may be performed to the delivery object P. "The on-line video coding" is a processing which performs the video coding to the delivery object P while being conveyed to the sorting portion 19, and sorts the delivery object P which has been subjected to the video coding into a sorting stacker in the same manner as the other delivery object P.

Figure 3:
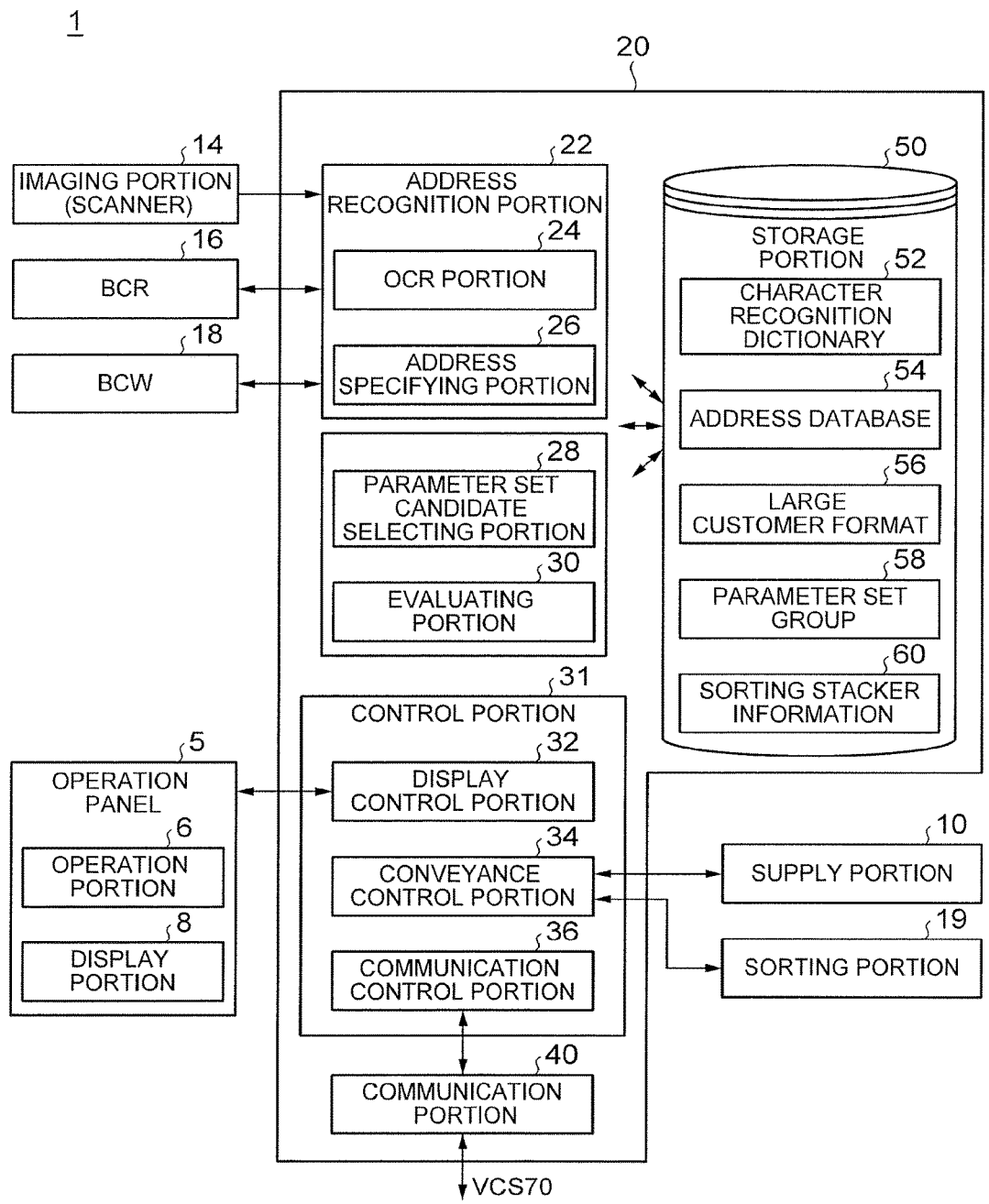
FIG. 3 is a functional configuration diagram mainly showing the delivery handling apparatus 20.

FIG. 3 is a functional configuration diagram mainly showing the delivery handling apparatus 20. The delivery handling apparatus 20 is provided with an address recognition portion 22, a parameter set candidate selecting portion 28, an evaluating portion 30, and control portion 31, for example. The control portion 31 is provided with a display control portion 32, a conveyance control portion 34, and a communication control portion 36, for example. The address recognition portion 22 is an example of "a recognition portion", and the parameter set candidate selecting portion 28, and the evaluating portion 30 are an example of "a parameter selecting portion".

In the present embodiment, the control portion 31 is a control portion which presides and control respective functional portions. That is, the processing explained hereinafter as the processing by the address recognition portion 22, the parameter set candidate selecting portion 28, the evaluating portion 30, which is realized by the control portion controlling the address recognition portion 22, the parameter set candidate selecting portion 28, the evaluating portion 30.

A part or all of the address recognition portion 22, the parameter set candidate selecting portion 28, the evaluating portion 30, the control portion 31 may be realized by that a processor such as a CPU (Central Processing Unit) executes a program. In addition, a part or all of these functional portions may be realized by a hardware such as an LSI (Large Scale Integration), an ASIC (Application Specific Integrated Circuit), an FPGA (Field-Programmable Gate Array), or may be realized by the cooperation of a software and a hardware. A storage portion 50 is realized by a storage device such as a RAM (Random Access Memory), a ROM (Read Only Memory), an HDD (Hard Disk Drive), a flash memory, for example. In the storage portion 50, a character recognition dictionary 52 which is used in an image recognition processing by the address recognition portion 22, an address database 54 in which a list of the address information is stored, a large customer format 56, a parameter set group 58, a sorting stacker information 60, and so on are stored.

The address recognition portion 22 is provided with an OCR portion 24, and an address specifying portion 26. The OCR portion 24, and the address specifying portion 26 perform an image recognition processing which will be described later. In addition, the OCR portion 24, and the address specifying portion 26 perform an image recognition processing, using a given parameter set. The parameter set is a set of parameters which are used in one or more processings included in the image recognition processing, and a threshold value in a banalization processing, a threshold value for determining success/unsuccess of character recognition, and so on are included in the parameter set, for example. In addition, a threshold value which is used in a processing of RGB (Red-Green-Blue) information at the time of converting a color image into a binary image may be included in the parameter set, for example. A threshold value for recognizing a closing line (background other than characters in an address description space) of a red or green color that is the RGB information included in the image, or a threshold value for processing (erasing) the recognized closing line are included in the threshold value to be used in the processing of the RGB information. In addition, a threshold value for determining contrast which is adjusted in accordance with the change in contrasting density of a printed character, a described character or the like, and a threshold value for determining a label size (an area for recognizing an individual character in a character string) of an individual character included in the image are included in the parameter set. The threshold value for determining the label size is a threshold value to be adjusted for properly recognizing a character, when a character is blurred (when the label size is large), or a part of a character is erased (when the label size is small).

An OCR (Optical Character Recognition) processing, an auxiliary processing for aiding the OCR processing, and an address specifying processing are included in the image recognition processing. The auxiliary processing is a processing to recognize a closing line and a position and a size of a mark included in the image, and recognize the position of an address description space in which address information of a delivery destination and address information of a sender are to be described. In the address description space, an area in which a full name, a telephone number and so on are to be described may be included. The address specifying processing includes a processing which specifies an address given to the delivery object P. The control portion 31 controls the sorting portion 19 to sort the delivery object P into a prescribed sorting stacker, based on the specified address.

The OCR portion 24 performs an OCR processing to the image imaged by the imaging portion 14, and recognizes a character, a symbol, a numerical character and so on included in the image.

The address specifying portion 26 searches the address database 54 stored in the storage portion 50, using the character, the symbol, the numerical character and so on which have been recognized by the OCR portion 24, and specifies an address given to the delivery object P, based on the information obtained by the search. In addition, the OCR portion 24 and the address specifying portion 26 may perform the processing in cooperation, while providing the respective processing results to each other.

In the present embodiment, when the control portion 31 has determined that a sorting stacker corresponding to an address had been specified with reference to the sorting stacker information 60 by the address specifying portion 26, the control portion 31 instructs sorting portion 19 to convey (sort) the delivery object P to the sorting stacker corresponding to the specified address. In addition, when the address control portion 31 has determined that a sorting stacker corresponding to an address had not been specified with reference to the sorting stacker information 60 by the address specifying portion 26, the control portion 31 instructs the sorting portion 19 to convey (sort) the delivery object P to the reject stacker.

Figures 4, 5:
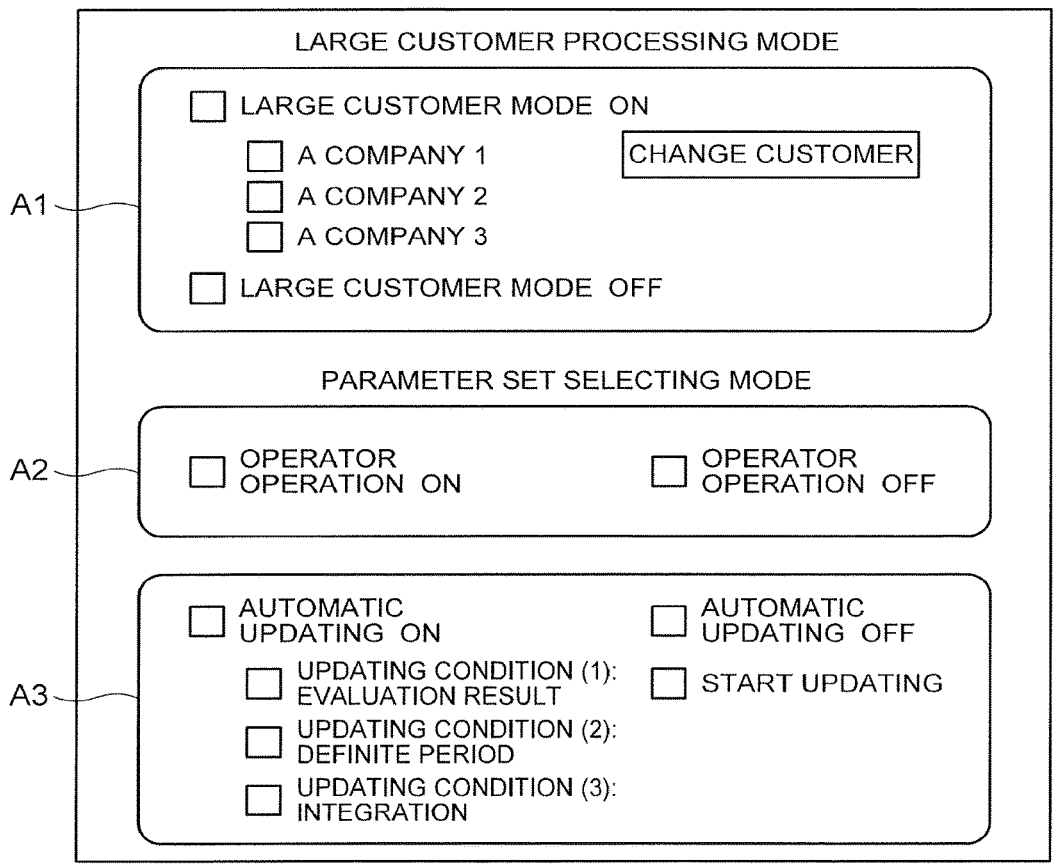
FIG. 4 is a diagram mainly showing an example of the sorting stacker information 60.
FIG. 5 is a diagram showing an example of a setting screen IM displayed on the display portion 8 in which setting of a large customer mode and so on are performed.

FIG. 4 is a diagram showing an example of the sorting stacker information 60. The sorting stacker information 60 is information in which address information is associated with each sorting stacker. For example, one or more information out of information (for example, a postal code, prefecture, municipality, street, block, address and so on) included in the address information is associated with each sorting stacker. For example, one or more municipalities may be associated with one sorting stacker, or one or more streets, or one or more addresses, or a combination of these and so on may be associated with one sorting stacker. For example, when the address recognition portion 22 could recognize an address to such a degree as to sort the delivery object P in a sorting stacker in the image recognition processing (a case in which an address of the delivery object P could be specified at a previously set degree or more), the control portion 31 determines that the delivery object P can be sorted in the sorting stacker. And the control portion 31 controls the sorting portion to sort the delivery object P in a sorting stacker capable of being determined based on the address specified at the previously set degree or more, out of a plurality of sorting stackers assigned to respective addresses. When the address recognition portion 22 could not recognize an address to such a degree as to sort the delivery object P in a sorting stacker, the control portion 31 determines that the delivery object P cannot be sorted in a sorting stacker. And the control portion 31 controls the sorting portion 19 to accumulate the delivery object P at a place different from a plurality of sorting places assigned to respective addresses.

More specifically, in the case in which a postal code is associated with one sorting stacker, when the address recognition portion 22 could recognize a postal code in an address specified in the image recognition processing (an example of "a case in which an address of the delivery object P could be specified at a previously set degree or more"), for example, the address recognition portion 22 determines that the delivery object P can be sorted in a sorting stacker associated with the recognized postal code, and when the address recognition portion 22 could not recognize a postal code and an address of a municipality supplementing the postal code in the specified address, the address recognition portion 22 determines that the delivery object P cannot be sorted in a sorting stacker (the delivery object P is sorted in a reject stacker, for example).

Here, parameter sets which the OCR portion 24 and the address specifying portion 26 use are different in a processing (a normal mode) to the delivery object P of a normal customer, and in a processing (a large customer mode) to the delivery object P of a large customer. The large customer is a customer who collectively sends a plurality of the delivery objects P having the same address description space.

For example, when the normal mode is selected, the OCR portion 24 performs an image recognition processing using a parameter set associated with the normal mode. There is no particular restriction regarding the parameter set in this normal mode, and accordingly, the delivery handling apparatus 20 may determine a parameter set by an arbitrary method. In addition, when the large customer mode is selected, the OCR portion 24 performs an image recognition processing using a plurality of parameter sets which are associated with the large customer mode, and which have been selected by the processings of the parameter set candidate selecting portion 28 and the evaluating portion 30.

In the case in which the large customer mode is executed, the parameter set candidate selecting portion 28 operates when a first prescribed condition is satisfied, extracts a plurality of parameter sets (a parameter set candidate) from the parameter set group 58 stored in the storage portion 50, and sequentially selects the parameter sets from the extracted parameter set candidate. The parameter set candidate selecting portion 28 makes the address recognition portion 22 perform an image recognition processing to an image of the delivery object P for testing, using the parameter sets which have been sequentially selected. The first prescribed condition is a condition suggesting that new setting or change of a parameter set described later is necessary.

The parameter set candidate selecting portion 28 selects a parameter set which satisfies a second prescribed condition (a prescribed condition), based on the evaluation result of the evaluating portion 30. For example, the parameter set which satisfies the second prescribed condition is a parameter set wherein a degree in which the delivery objects P have been sorted in sorting stackers based on the image recognition processing, out of the delivery objects P subjected to the image recognition processing is not less than a first threshold value, or is a parameter set wherein a degree in which the delivery objects P have been sorted in sorting stackers is the highest. In other words, the parameter set which satisfies the second prescribed condition is a parameter set wherein a degree in which the delivery objects P are sorted in a place different from sorting stackers based on the result of the image recognition processing of the delivery objects P is less than the first threshold value, or is a parameter set wherein a degree in which the delivery objects P have been sorted in a place different from the sorting stackers is the lowest.

The evaluating portion 30 evaluates the parameter set, based on the result of the image recognition processing by the address recognition portion 22. The evaluating portion 30 evaluates the parameter set, based on the degree in which the delivery objects P have been sorted in sorting stackers based on the result of the image recognition processing. The higher the degree in which the delivery objects P have been sorted in the sorting stackers, the higher the evaluation of the parameter set used in the processing tends to become.

The conveyance control portion 34 controls the sorting portion 19, based on an instruction of the address specifying portion 26, for example, to sort the delivery object P into a sorting stacker corresponding to the specified address, or to convey the delivery object P to a reject stacker. In addition, the conveyance control portion 34 recognizes a position of the delivery object P in the delivery handling system 1, based on a timing when the delivery object P has been taken out from the supply portion 10 and has been sent to the conveying structure 12, a speed at which the conveying structure 12 conveys the delivery object P, a speed at which the conveying structure 19A conveys the delivery object P, and the detection result of the detection sensor 19D. And when the delivery object P approaches the accumulating and conveying structure 19B for conveying the delivery object P to the sorting stacker instructed by the address specifying portion 26, the conveyance control portion 34 controls the switching portion 19C arranged at the branching point of the accumulating and conveying structure 19B to be in an ON state. By this means, the delivery object P is conveyed to the sorting stacker instructed by the address specifying portion 26.

The display control portion 32 controls the display portion 8 to make a desired image to be displayed. The communication control portion 36 transmits the information which the delivery handling apparatus 20 holds, to the other delivery handling apparatus using a communication portion 40.

Hereinafter, a processing in the large customer mode that is a mode which handles the delivery object P to be sent by a large customer will be described. The delivery objects P to be sent by large customers are each printed with an address and so on (or pasted with a printed address) with one or a definite number of formats in many cases. Accordingly, the address recognition portion 22 can perform the image recognition processing using one parameter set repeatedly.

In the present embodiment, when the first prescribed condition is satisfied, the control portion 31 makes the parameter set candidate selecting portion 28 sequentially selects parameter sets from the parameter set candidate, and makes the address recognition portion 22 perform the image recognition processing to the delivery object P of the large customer that is the processing object, using the selected parameter set. And the evaluating portion 30 evaluates the results of the image recognition processing corresponding to the respective parameter sets, and thereby selects a parameter set which satisfies the second prescribed condition and is used for handling the delivery object P of the large customer that is the processing object. Hereinafter, this will be described specifically.

Setting of a large customer mode, a customer who is a large customer and other setting may be performed by an operation of an operator of the delivery handling apparatus 20. FIG. 5 is a diagram showing an example of a setting screen IM which is to be displayed on the display portion 8 and in which setting of the large customer mode and so on are performed. The setting screen IM is an example of a screen to be displayed on the display portion 8 when a prescribed operation to designate the delivery object P of an A company as a large customer is performed to the operation portion 6 by an operator. In the setting screen IM, a setting area A1 for setting whether the large customer mode is in an ON state or in an OFF state, for example, is included. In the drawing, "A company 1" indicates a format numbered with "1", out of formats which A company that is a large customer uses. An operator of the delivery handling apparatus 20 clicks the setting screen A1 with a mouse, or taps other desired position, and thereby can perform setting of ON/OFF, setting of change of the large customer format, and setting of a large customer format which another large customer uses.

In addition, a setting area A2 for setting whether an operator selects a selecting mode of a parameter set or the delivery handling apparatus 20 automatically selects it is included in the setting screen IM. The operator clicks a desired place in the setting area A2 with a mouse, and thereby it is possible to set a mode in which the operator selects a parameter set, or a mode in which a parameter set is automatically selected.

When the operator sets the mode in which the parameter set is selected by the operator, the setting screen IM transfers to a selecting screen for selecting a parameter set, for example. In the drawing, "operator operation ON" is a setting area of a mode in which the parameter set is selected by the operator, and in the drawing, "operator operation OFF" is a setting area of a mode in which the parameter set is automatically selected.

In addition, a setting area A3 for setting whether an updating processing of a parameter set is automatically started or it is manually started is included in the setting screen IM. In addition, a setting area for setting an updating condition (the first prescribed condition) when the updating processing of the parameter set is automatically started is included in the area A3. The updating condition in the case in which the parameter set is automatically updated is selected from (1), (2) and (3) described below. (1): That the result of the image recognition processing satisfies a prescribed condition (in the drawing, described as "evaluation result") (2): That a definite period elapsed after the evaluating portion 30 has selected a suitable parameter set, and the address recognition portion 22 has performed the image recognition processing using the selected suitable parameter set (in the drawing, described as "definite period") (3) That one of the above-described (1) and (2) is satisfied (in the drawing, described as "integration") In addition, the updating condition is not limited to these, but may be that both of the above-described (1) and (2) are satisfied. In addition, the updating condition is not limited to these, but may be fixed to any one of these.

In addition, the condition in which the parameter set is updated may be that a prescribed operation has been performed by an operator. In this case, updating of the parameter set is manually started by an operation to an updating start button (in the drawing, described as "start updating") included in the setting area A3 of the setting screen IM by an operator.

Figure 6:
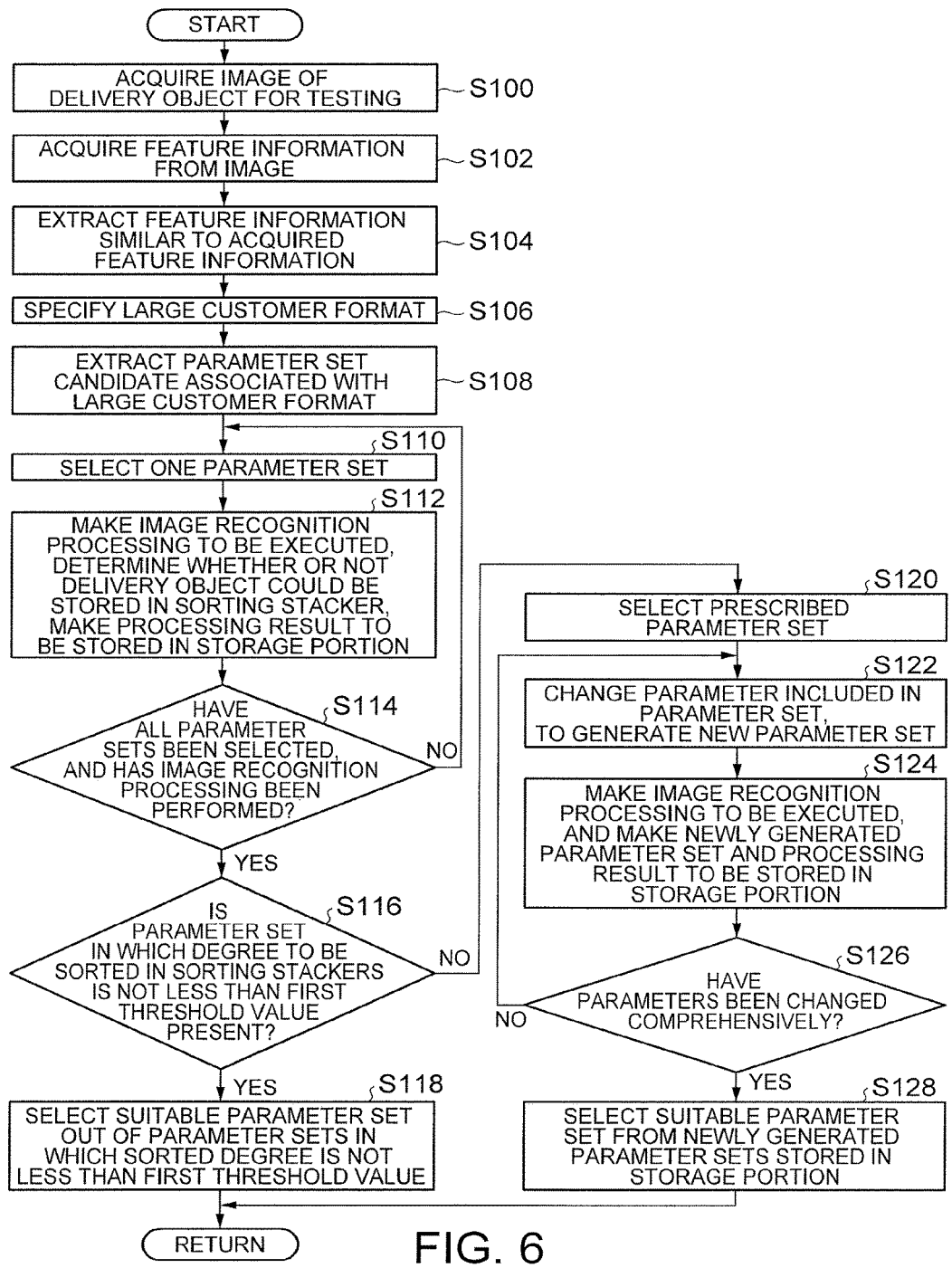
FIG. 6 is a flow chart showing a flow of a large customer mode start processing to be executed by the delivery handling apparatus 20.

FIG. 6 is a flow chart showing a flow of a large customer mode start processing to be executed by the delivery handling apparatus 20. The present processing is executed when an operator has set the large customer mode to an ON state in the setting screen IM shown in FIG. 5, and has performed a prescribed operation to instruct starting of the large customer mode to the operation portion 6, for example. In addition, right address information included in an image of the delivery object P for testing may not be known in advance.

To begin with, the address recognition portion 22 acquires images of a prescribed number of the delivery objects P for testing which have been imaged by the imaging portion 14 (step S100). Letters having the same feature information (the same large customer format, for example) described later are respectively given to the delivery objects P for testing. In addition, the delivery object P for testing may be the delivery object P which is to be actually handled, for example, or may be the delivery object P which is not to be handled. In addition, a previously acquired image may be used as the image stored in the storage portion 50 of the delivery object P for testing.

Next, the parameter set candidate selecting portion 28 acquires feature information from the acquired images (step S102). The feature information is a size of a closing line that is an address description space in the image, a kind of the closing line, an aspect ratio of the closing line, a position of the closing line, a kind of a prescribed mark, a position of the prescribed mark and so on. The control portion 31 makes the address recognition portion 22 perform the above-described "auxiliary processing" to the images of the processing objects. And the parameter set candidate selecting portion 28 acquires the feature information based on the result of auxiliary processing.

Next, the parameter set candidate selecting portion 28 compares the acquired information with the feature information included in the large customer format 56, to extract similar feature information (step S104). Next, the parameter set candidate selecting portion 28 specifies a large customer format, based on the extracted similar feature information (step S106). The processings of the step S102 to the step S106 for specifying the large customer format may be omitted, when the large customer format is selected in the setting screen IM by the operator.

Here, the large customer format will be described using FIG. 7. FIG. 7 is a diagram schematically showing information included in the large customer format 56. Information indicating a kind of the closing line, a size of the closing line, an aspect ratio of the closing line, an arrangement of the closing line, a kind of the mark, an arrangement of the mark and so on is described in the large customer format 56 for each format of the large customer. The large customer format 56 is an example of "known feature information of an address description space".

For example, when the arrangement of the closing line of the large customer format of the processing object is within a prescribed range with respect to the arrangement of the closing line of the known large customer format, the parameter set candidate selecting portion 28 determines that the large customer format of the processing object and the known large customer format are similar. In addition, for example, when the size of the closing line of the large customer format of the processing object has been enlarged or reduced by a prescribed range, and the enlarged or reduced size thereof is coincident with the size of the closing line of the known large customer format, the parameter set candidate selecting portion 28 determines that the large customer format of the processing object and the known large customer format are similar. By this means, it is possible to automatically determine to what large customer format the address description space of the delivery object P corresponds.

Here, the description will be returned to FIG. 6. Next, the parameter set candidate selecting portion 28 extracts a parameter set candidate associated with the specified large customer format (step S108). In this manner, the parameter set candidate selecting portion 28 extracts a format similar to the format (closing line and so on) obtained from the image of the processing object, from the large customer format 56 stored in the storage portion 50, and acquires a parameter set candidate associated with the extracted large customer format.

Here, a parameter set group will be described using FIG. 8. FIG. 8 is a diagram showing an example of the parameter set group 58 stored in the storage portion 50. A plurality of parameter sets are associated with respective tested large customer formats. For example, parameter sets A1-1 to A1-3 are associated with a large customer format "A company 1" (a format 1 of a large customer A company), parameter sets A2-1 to A2-5 are associated with a large customer format "A company 2" (a format 2 of a large customer A company), and parameter sets B1-1 to B1-4 are associated with a large customer format "B company 1" (a format 1 of a large customer B company). For example, the parameter set candidate associated with "A company 1" is the parameter sets A1-1 to A1-3.

The parameter set associated with the large customer format is used for an image recognition processing to an address described in the large customer format. This parameter set shows that the result of the image recognition processing is better compared with another parameter set, for example. In addition, one or more parameter sets are set to a large customer format for each environmental factor, for example.

The environmental factor is a strength of light, a high/low level of the temperature, a high/low level of the humidity in an area where the delivery handling apparatus 20 is installed. For example, if light to be irradiated to the delivery object P becomes strong, the reflected light from the delivery object P becomes also strong, and thereby sharpness of the image acquired by the imaging portion 14 may be decreased. For example, a parameter set for reducing influence of the reflection is associated with a tested large customer format. This parameter set is derived previously based on an experimental result, for example, and is stored in the storage portion 50. In addition, one or more parameter sets may be set to the large customer format for each prescribed factor, for example. This prescribed factor includes an aspect such as a printed character and a described character of the delivery object P. The aspect of the printed character and so on is a denseness and a thickness of the printed character and the described character. Accordingly, as the aspect of the printed character and so on varies, a brightness value of the printed character or the described character varies, and thereby the result of the image recognition processing may be different.

In addition, the processing to determine what large customer format the delivery object P of the processing object has may be performed manually. In this case, the parameter set candidate selecting portion 28 determines the parameter set candidate to be extracted from the parameter set group 58, based on an operation of an operator, for example. The display control portion 32 makes an image including the large customer format corresponding to the known feature information to be displayed on the display portion 8, for example. The operator selects an image of the large customer format similar to the large customer format of the delivery object P of the processing object, based on the image displayed on the display portion 8, and thereby the parameter set candidate is determined.

Here, the description will be returned to FIG. 6. The parameter set candidate selecting portion 28 selects one parameter set out of the parameter set candidate extracted in the step S108 (Step S110). The parameter set candidate selecting portion 28 outputs the parameter set selected from the parameter set candidate to the address recognition portion 22. And, the control portion 31 makes the address recognition portion 22 execute the image recognition processing to the images of a prescribed number of the delivery objects P for testing, and determines whether or not the delivery objects P could be sorted respectively in the sorting stackers corresponding to the specified addresses, based on the addresses specified in the image recognition processing, and makes the determining result to be stored in the storage portion 50 (step S112). Next, the parameter set candidate selecting portion 28 determines whether or not the all parameter sets in the parameter set candidate have been selected, and the image recognition processings have been performed to the delivery objects P with the all parameter sets (step S114).

When the image recognition processings have not been performed to the delivery objects P with the all parameter sets, the processing of the delivery handling apparatus 20 returns to the processing of the step S110, a parameter set which has not been selected is selected. In step S112, the image recognition processing is performed for all images imaged within step S100. When the image recognition processings have been performed to the delivery objects P with the all parameter sets based on the determining result stored in the storage portion 50 within step S112, the evaluating portion 30 determines whether or not the parameter set wherein a degree (a degree in which sorting stackers for sorting the delivery objects P have been specified in the image recognition processing) in which the delivery objects P have been sorted in the sorting stackers is not less than a first threshold value exists (step S116). In addition, a sorted degree is not limited to a degree in which the delivery objects P have been sorted in the sorting stackers, but includes a degree in which sorting stackers for sorting the delivery objects P have been specified in the image recognition processing and it is determined that the delivery objects P can be sorted into the specified sorting stackers.

When the parameter set in which the sorted degree is not less than the first threshold value exists, the parameter set candidate selecting portion 28 selects a suitable parameter set out of the parameter sets in which the sorted degree is not less than the first threshold value (step S118). The suitable parameter set is a parameter set in which the evaluation of the evaluating portion 30 is the highest, for example. That is a parameter set in which the degree in which the delivery objects P have been sorted in the sorting stackers is the highest.

Here, the evaluation of the image recognition processing will be described using FIG. 9. FIG. 9 is a diagram showing an example of the result that the image recognition processing has been evaluated. In the present drawing, it is presupposed that "A company 1" has been selected as the large customer format, in the step S106 in FIG. 6. In this case, the address recognition portion 22 sequentially applies the parameter sets A1-1 to A1-3, and executes the image recognition processing using the respective parameter sets. In the present drawing, when the parameter set A1-2 is used, the degree (sorting rate, for example) in which the delivery objects P have been sorted in the sorting stackers is the highest, and accordingly, the parameter set A1-2 is selected for the large customer format "A company 1".

Here, the description will be returned to FIG. 6. When the parameter set in which the sorted degree is not less than the first threshold value does not exist, the parameter set candidate selecting portion 28 selects a prescribed parameter set (step S120). The prescribed parameter set is a parameter set wherein the degree in which the delivery objects P have been sorted in the sorting stackers is the highest. Next, the parameter set candidate selecting portion 28 individually changes one or more parameters included in the selected parameter set within prescribed ranges, to generate a new parameter set (step S122).

Next, the parameter set candidate selecting portion 28 outputs the parameter set generated in the step S122 to the address recognition portion 22. And, the parameter set candidate selecting portion 28 makes the address recognition portion 22 execute the image recognition processing to the images of a prescribed number of the delivery object P for testing, and makes the delivery objects P to be sorted in the sorting stackers corresponding to the specified addresses, based on the addresses specified in the image recognition processing, and makes the newly generated parameter set and the processing result to be stored in association in the storage portion 50 (step S124).

Next, the parameter set candidate selecting portion 28 determines whether or not the parameters included in the parameter set selected in the step 120 have been comprehensively changed within a prescribed range (step S126). When the parameters included in the selected parameter set have not been comprehensively changed, the processing returns to the processing of the step S122. When the parameters included in the selected parameter set have been comprehensively changed, the parameter set candidate selecting portion 28 selects a suitable parameter set out of the newly generated parameter sets stored in the storage portion 50 (step S128). In this manner, the parameter set candidate selecting portion 28 newly generates a suitable parameter set. By this means, the processing of the present flow chart is finished.

In addition, the parameter set candidate selecting portion 28 determines whether or not a degree in which the delivery objects P have been sorted in sorting stackers is not less than a first threshold value, each time a new parameter set is generated, and when the sorted degree is not less than the first threshold value, stops newly generating a parameter set, and may select the parameter set as a suitable parameter set. In addition, in the processing of the step S128, the parameter set candidate selecting portion 28 may select a suitable parameter set out of the newly generated parameter set and the parameter set selected in the step S110.

By the above-described processings, the parameter set candidate selecting portion 28 can select a suitable parameter set for the delivery object P of the processing object.

[Modification of flow chart] In addition, the processing of the flow chart shown in FIG. 6 may be changed as described below. In the processing of the step S116, the evaluating portion 30 compares the sorting stackers in which the delivery objects P are to be sorted and a right address of the delivery object P stored in the storage portion 50, and may determine whether or not a parameter set (an example of "the parameter set which satisfied the second condition") wherein a degree in which the delivery objects P have been sorted in the sorting stacker corresponding to the right address (a degree in which the control portion 30 has determined that the delivery objects P have been sorted in sorting stackers corresponding to a right address) is not less than a second threshold value exists. "a right address" means an address which is given to the delivery objects P. "a degree in which the delivery objects P have been sorted in sorting stackers corresponding to a right address" means a percentage whether or not the delivery objects P have been sorted in sorting stackers corresponding to a right address, for example. In this case, the higher a degree in which the delivery objects P have been sorted in the right sorting stacker is, the higher evaluation the evaluating portion 30 gives to the parameter set. When the parameter set with not less than the second threshold value exists, the processing proceeds to the processing of the step S118, and when the parameter set with not less than the second threshold value does not exist, the processing proceeds to the processing of the step S120.

The evaluating portion 30 makes a right address of the delivery object P, a sorting stacker corresponding to the right address, and a sorting stacker in which the delivery object P has been actually sorted by the image recognition processing, in association with each delivery object ID of the delivery object P, to be stored in the storage portion 50, as processing result information 62. FIG. 10 is a diagram showing an example of the processing result information 62.

And the evaluating portion 30 derives a degree (a sorting rate, for example) in which the delivery objects P have been sorted in sorting stackers corresponding to the right addresses, with reference to the processing result information 62, and evaluates the image recognition processing, based on the derived degree. FIG. 11 is a diagram showing another example of the result that the image recognition processing has been evaluated. In the present drawing, a degree in which the delivery objects P have been sorted in the sorting stackers corresponding to the right addresses is the highest when the processing has been performed using the parameter set A1-2, and accordingly, the parameter set A1-2 is selected to the large customer format "A company 1".

When the degree in which the delivery objects P have been sorted in the sorting stackers corresponding to the right addresses is used for the evaluation of the parameter set, in the step S128 of FIG. 6, the parameter set wherein the degree in which the delivery objects P have been sorted in the sorting stackers corresponding to the right addresses is the highest is selected as a suitable parameter set.

In the above-described processing, the delivery handling apparatus 20 selects the suitable parameter set, based on the degree in which the delivery objects P have been sorted in the sorting stackers corresponding to the right addresses, and thereby the delivery handling apparatus 20 can select a more suitable parameter set, compared with a case to select the suitable parameter set without considering whether or not the delivery objects P have been sorted in the right sorting stackers.

In addition, the evaluation of the image recognition processing by the evaluating portion 30 may be performed by evaluating the parameter set, based on a misleading rate that is the difference between the address information included in an image of the delivery object P for testing (or the information actually given to the delivery object P) and the information acquired as a result of the image recognition processing by the address recognition portion 22, for example. In this case, the suitable parameter set satisfying the second prescribed condition is a parameter set having a misreading rate of not more than a prescribed value, or a parameter set having the lowest misreading rate. In addition, the evaluation of the image recognition processing of the parameter set satisfying the second condition may be performed based on a matching rate of the right address and the address recognized by the image recognition processing, or based on a score that is a result obtained by integrating the matching rate of the right address and the address recognized by the image recognition processing and the misreading rate. When the image recognition processing is evaluated based on the score, the suitable parameter set satisfying the second prescribed condition is a parameter set having a score of not less than a prescribed value, or a parameter set having the highest score.

Figure 12:
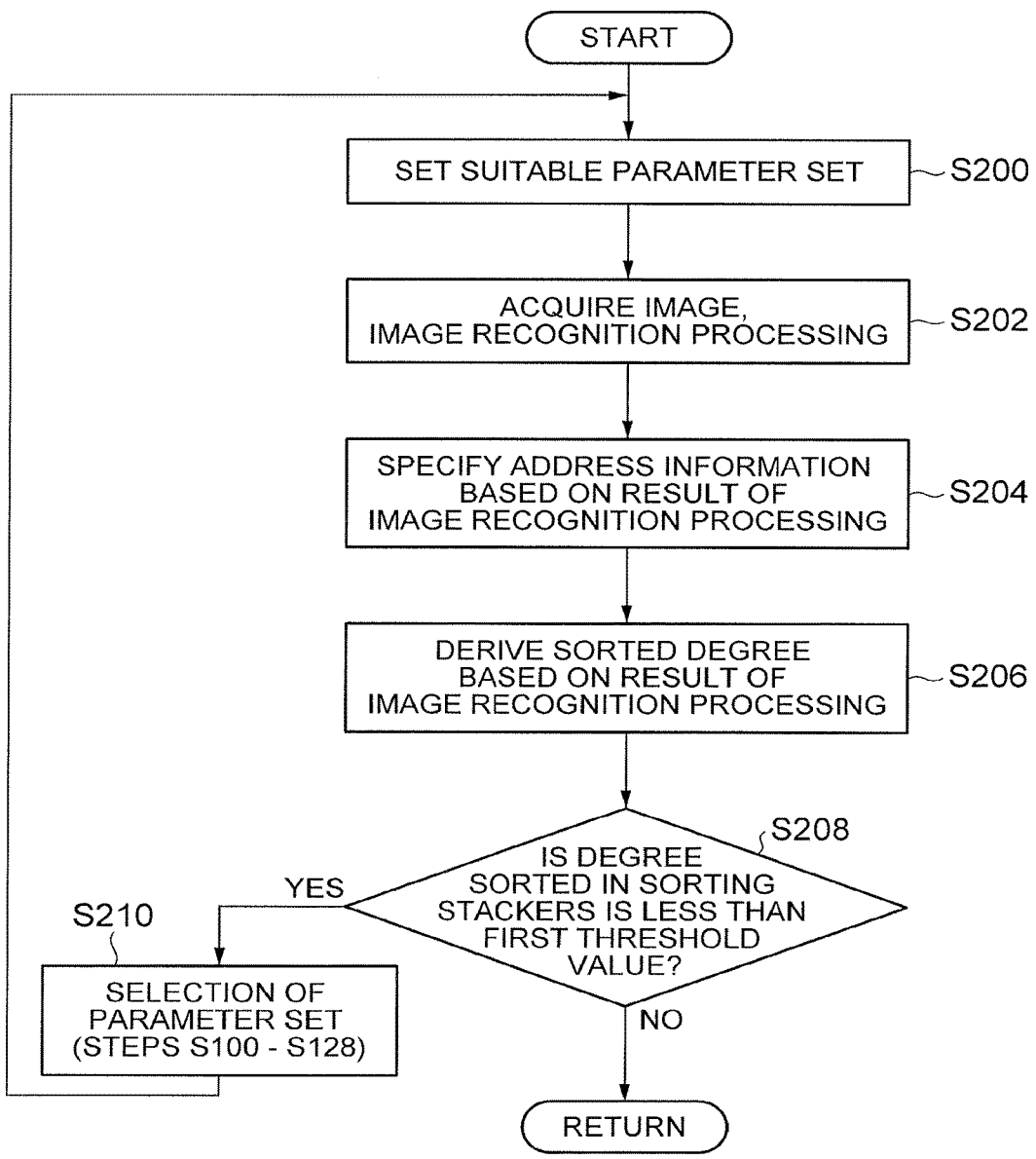
FIG. 12 is a flow chart showing a flow of a processing to be executed when the delivery object P is to be actually handled by the delivery handling apparatus 20.

FIG. 12 is a flow chart showing a flow of a processing to be executed when the delivery object P is actually handled by the delivery handling apparatus 20. The present processing is a processing to be executed after the suitable parameter set has been selected by the parameter set candidate selecting portion 28, as described in FIG. 6, for example.

To begin with, the address recognition portion 22 sets a suitable parameter set (step S200). The suitable parameter set is the suitable parameter set which has been selected by the parameter set candidate selecting portion 28 in the above-described step S118 or step S128 of FIG. 6 and has been outputted to the address recognition portion 22.

Next, the control portion 31 makes the address recognition portion 22 acquires the image of the processing object, and executes the image recognition processing to the acquired image (step S202). Next, the address specifying portion 26 specifies address information based on the result of the image recognition processing (step S204). And the control portion 31 specifies a sorting stacker for sorting the delivery object P, based on the specified address information. Next, the evaluating portion 30 derives a degree in which the delivery objects P have been sorted in the sorting stackers, based on the result of the image recognition processing (step S206). Next, the evaluating portion 30 determines whether or not the sorted degree is less than a first threshold value (step SS208). To be less than the first threshold value is an example of "to satisfy the first prescribed condition".

Figure 13:
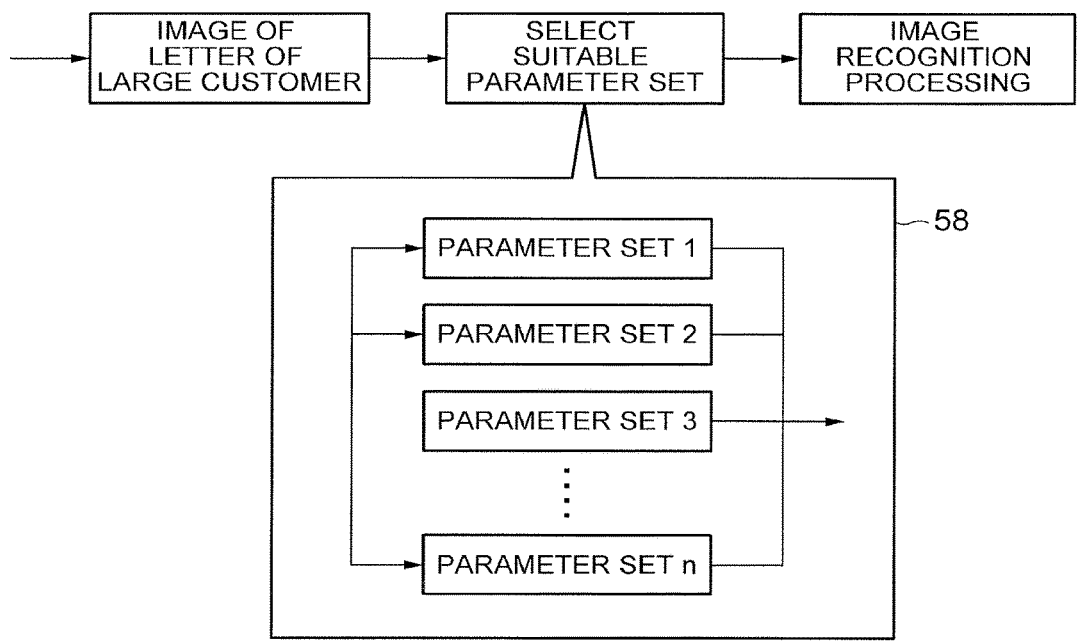
FIG. 13 is a conceptual diagram of a processing of the parameter set candidate selecting portion 28.

When the sorted degree is less than the first threshold value, the processing proceeds to the processing of a step S210. In this case, the delivery handling apparatus 20 temporarily stops the processing in execution (the processing for acquiring an image of the delivery object P, the image recognition processing and so on, for example). The processing of the step S210 is the processings from the step S100 to the step S128 in the flow chart of FIG. 6. That is, the parameter set candidate selecting portion 28 sequentially selects a plurality of the parameter set candidates stored in the storage portion 50. FIG. 13 is a conceptual diagram of a processing of the parameter set candidate selecting portion 28.

For example, when the parameter set which has been suitable becomes unsuitable due to change in a bulk (many delivery objects P with the same format) or change in a certain environmental factor, and the sorted degree becomes less than a previously set first threshold value, the processing to narrow down the parameter set candidate and to select a new suitable parameter set are executed in the processing of S210 of FIG. 12. The change in the certain environmental factor is that the environment (light, a temperature, a humidity, and so on) of the area where the delivery handling apparatus 20 is installed may be changed. In addition, secular change of the apparatus itself may be included in the environmental factor.

When it is determined that the sorted degree is not less than the first threshold value in the processing of the step 208, the processing proceeds to the processing of the step S202, while keeping the parameter set which has been set in the step S200.

In addition, in the above-described example, it has been described that when the sorted degree is less than the first threshold value, the processing to select a parameter set again is performed, but the processing to select a parameter set again may be performed, when a first prescribed condition exemplified below is satisfied. The first prescribed condition is a condition for recognizing various phenomena to be generated when the parameter set is not suitable. The first prescribed condition may be set arbitrarily by an operator or a manager of the apparatus. For example, the first prescribed condition (regarding the result of the image recognition processing) is that a score for the result of the image recognition processing by the address recognition portion 22 has become not more than a prescribed value, or a frequency of the processings performed by the VCS 70 has become not less than a prescribed frequency.

The score is a result in which, out of a recognition rate in which the information given to the large customer format of the delivery object P has been recognized, the number of times (or a frequency) in which an address has not been specified by the address specifying portion 26, and the number of the delivery objects P which have been sorted in the VCS stacker, a part or whole of them are statistically processed. The recognition rate is a rate of the information (a character, a symbol, a numerical character and so on) recognized by the image recognition processing, to the information given to the large customer format of the delivery object P. For example, when the recognition rate is lower, when the number of times in which the address has not been specified is larger, or when the number of the delivery objects P sorted in the VCS stacker is larger, the score is derived in a lower trend. When the score is low, it is determined that the first prescribed condition is satisfied.

In addition, the first prescribed condition may be that a degree of coincidence between the result of the image recognition processing by the address recognition portion 22 and the address information specified as a result of searching the address database 54 is not more than a prescribed value. In this case, when the degree of the coincidence is low, it is determined that the first prescribed condition is satisfied.

In addition, the first prescribed condition may be that the number of times (or a frequency) in which the information actually given to the large customer format, and the information which has been acquired as a result of the image recognition processing by the address recognition portion 22 are different (Hereinafter, referred to as "misreading.") has becomes not less than a prescribed value. In this case, when the number of times or the frequency of misreading is large, it is determined that the first prescribed condition is satisfied.

As the determination of misreading, the evaluating portion 30 may determine that when the information of the same delivery destination address continue for not less than a prescribed number, the misreading is generated. Senders of the delivery objects P to be sent by a large customer are the same (the large customer), and addresses of delivery destinations are different for the respective delivery objects P. Accordingly, when the information of the same delivery destination address continues for not less than a prescribed number, there is a case in which an area given with information of an address of a sender of the large customer format is recognized as an area given with information of a delivery destination address. In the case of the large customer format, information of sender addresses are fundamentally the same, and information of delivery destination addresses are different, but on the contrary, when information of sender addresses are different, and information of delivery destination addresses are the same, the evaluating portion 30 determines that the misreading has occurred.

In addition, the misreading may be determined based on the information inputted by an operator of the VCS 70. The result of the image recognition processing to the prescribed delivery object P and the image of the imaged delivery object P are displayed in real time on the display portion of the VCS 70 in a comparable manner. The operator compares the result of the image recognition processing and the image of the delivery object P, and determines whether or not the result of the image recognition processing is correct, and inputs the determination result into an operation portion of the VCS 70. The evaluating portion 30 of the delivery handling apparatus 20 acquires the information relating to the input operation by the operator, and makes the acquired information to be stored in the storage portion 50. The evaluating portion 30 derives a recognition rate, and a misreading rate, based on the information stored in the storage portion 50. The display control portion 32 makes the derived result to be displayed on the display portion 8. In addition, the communication control portion 36 makes the derived result to be transmitted to the VCS 70, using the communication portion 40.

Figure 14:
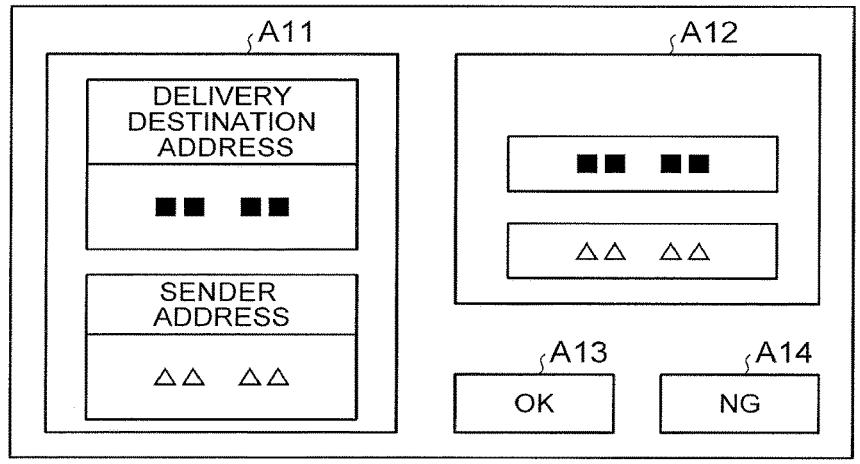
FIG. 14 is a diagram showing an example of a monitor image IM1 to be displayed on a display portion of the VCS 70.

The VCS 70 may make the result of the image recognition processing and the image of the delivery object P to be displayed on a display portion. FIG. 14 is a diagram showing an example of a monitor image IM1 to be displayed on the display portion of the VCS 70. In the monitor image IM1, a display area A11 in which the delivery object P is to be displayed, a display area A12 in which text information that is the result of the image recognition processing of the address recognition portion 22 to the delivery object P, and information such as a graphic symbol, a symbol, a numerical character are to be displayed are included. This image of the delivery object P is an image of the delivery object P which has been arbitrarily extracted from the delivery objects P which have been handled by the delivery handling apparatus 20, for example. In addition, in the monitor image IM1, a selecting area A13 in which when the result of the image recognition processing is correct, a selecting operation is performed by an operator, and a selecting area A14 in which, when the result of the image recognition processing is not correct, a selecting operation is performed by an operator.

In the present embodiment, when the result of the image recognition processing satisfies the first prescribed condition, the parameter set candidate selecting portion 28 and the evaluating portion 30 automatically select a suitable parameter set, and can automatically maintain the result of the image recognition processing to be not less than a prescribed value, or can improve the result of the image recognition processing. As this result, it is possible to improve convenience of a user and recognition accuracy.

Here, in the case of generating a parameter included in a parameter set for each image, there was a case in which a high speed processing cannot be realized. In addition, conventionally, there was a case in which a person selects a parameter set from experience and so on, and thereby there was a case which lacks in convenience and is insufficient in accuracy. In contrast, the delivery handling apparatus 20 of the present embodiment reduces these problems, and thereby can improve convenience and recognition accuracy.

Figure 15:
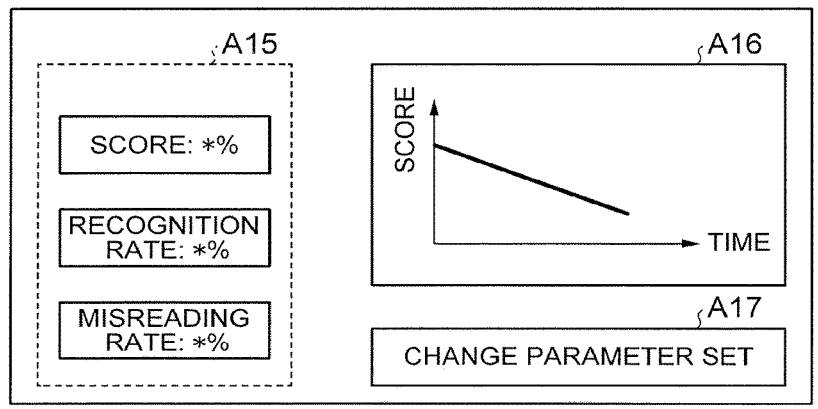
FIG. 15 is a diagram showing an example of a processing result image IM2 showing the result of the image recognition processing to be displayed on the display portion 8.

In addition, the display control portion 32 may make the result of the image recognition processing to be displayed on the display portion 8. FIG. 15 is a diagram showing an example of a processing result image IM2 showing the result of the image recognition processing to be displayed on the display portion 8. For example, in the image IM2, a display area A15 is included in which the above-described score, and information such as a recognition rate, a misreading rate and so on of the information by the image recognition processing are to be displayed. In addition, a display area A16 including information indicating the score in time series, and a setting area A17 including a parameter set change button for setting change of a parameter set by an operation of an operator set are included in the image IM2.

The operator refers to the above-described information, and thereby can recognize whether or not the parameter set is suitable. When having determined that the parameter set is not suitable, the operator operates the parameter set change button, and thereby can change the parameter set. In addition, these information may be real-time information to the processing, and may be information relating to summed-up result in a sampling time.

In addition, also in a scene in which it is supposed that not the delivery objects P from a large customer, but the delivery objects P in which addresses and so on are described in a definite format will continue, the large customer mode may be executed. When the scene like this is present, a name of "the large customer mode" may be changed.

Figure 16:
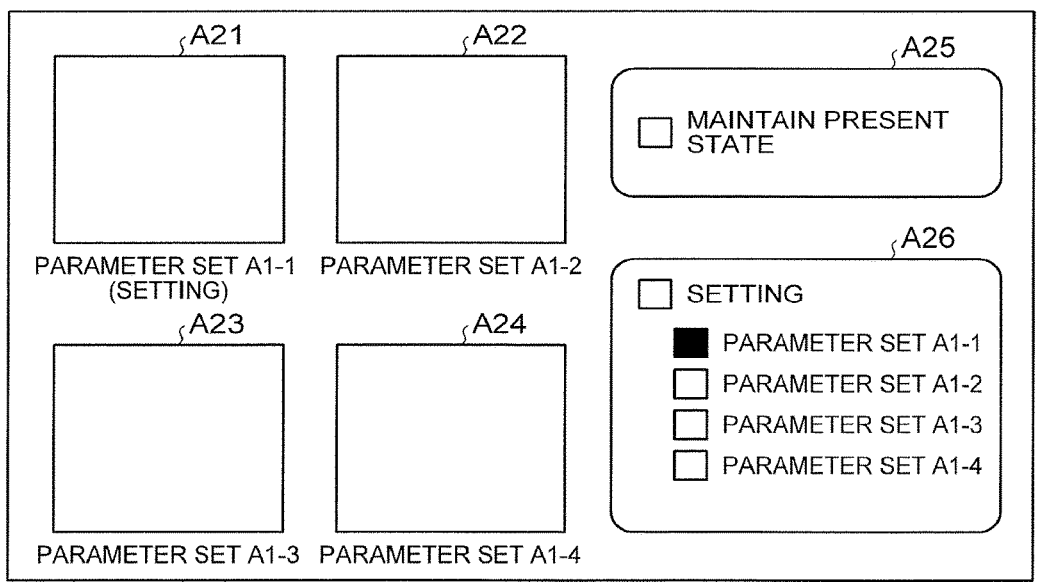
FIG. 16 is a diagram showing a comparison image IM3 in which the result of the image recognition processing to be displayed on the display portion 8 is shown in a comparable manner.

In addition, the display control portion 32 may make the result of the image recognition processing to be displayed on the display portion 8 in a comparable manner. FIG. 16 is a diagram showing an example of a comparison image IM3 in which the result of the image recognition processing to be displayed on the display portion 8 is indicated in a comparable manner. In the comparison image IM3, images (for example, binary images) that are results that images of the processing object are subjected to the image recognition processings using different parameter sets, for example, are displayed in association with the information of the parameter sets used in the address recognition portion 22. For example, a display area A21 in which an image that is the result of the image recognition processing using the parameter set A1-1 is displayed is included in the comparison image IM3.

In addition, in the comparison image IM3, a display area A22 in which an image that is the result of the image recognition processing using the parameter set A1-2 is displayed, a display area A23 in which an image that is the result of the image recognition processing using the parameter set A1-3 is displayed, and a display area A24 in which an image that is the result of the image recognition processing using the parameter set A1-4 is displayed, are included. In addition, on the display portion 8, information of the parameter set which has been set in the address recognition portion 22 at present, and image acquired using the parameter set are displayed in association with each other. The images that are the results that different parameter sets are set and the image recognition processings are performed using the different parameter sets are displayed in a comparable manner, and thereby an operator can recognize a suitable parameter set.

In addition, an operator can select a parameter set with a high accuracy in the image recognition processing, based on noise and sharpness of the information in the comparison image IM3, for example. For example, in the comparison image IM3, an area A25 including an operation button for maintaining the parameter set in the address recognition portion 22 as it is, and an area A26 including an operation button 25 for setting a parameter set to be set in the address recognition portion 22 are included.

For example, when any one of the operation buttons (in the drawing, any one of the parameter sets A1-1 to A1-4) for selecting respective parameter sets included in the area A26, and the setting button is operated by an operator, the parameter set selected by the operator is set in the address recognition portion 22. In addition, the number of the images is not limited to four, but an arbitrary number of the images may be displayed on the display portion 8. For example, on the display portion 8, an image that is the result of the image recognition processing performed using the selected suitable parameter set may be displayed.

If it is after the control portion 31 makes the parameter set candidate selecting portion 28 execute the image recognition processing using the parameter set selected by the parameter set candidate selecting portion 28, the above-described comparison image IM3 may be displayed on the display portion 8 at an arbitrary timing. In addition, the comparison image IM3 may be displayed on the display portion 8 when a prescribed operation has been performed to the operation portion 6 by an operator. Since the operator can select a parameter set in this manner, convenience for a user is improved more.

Hereinafter, a case will be described in which, in the setting screen IM for setting a large customer mode and so on of FIG. 5, "(2) definite period" is selected as an updating condition (a first prescribed condition) of a parameter set. In this case, the delivery handling apparatus 20 performs selection of a suitable parameter set again, when a definite period elapsed after selecting a suitable parameter set.

Figure 17:
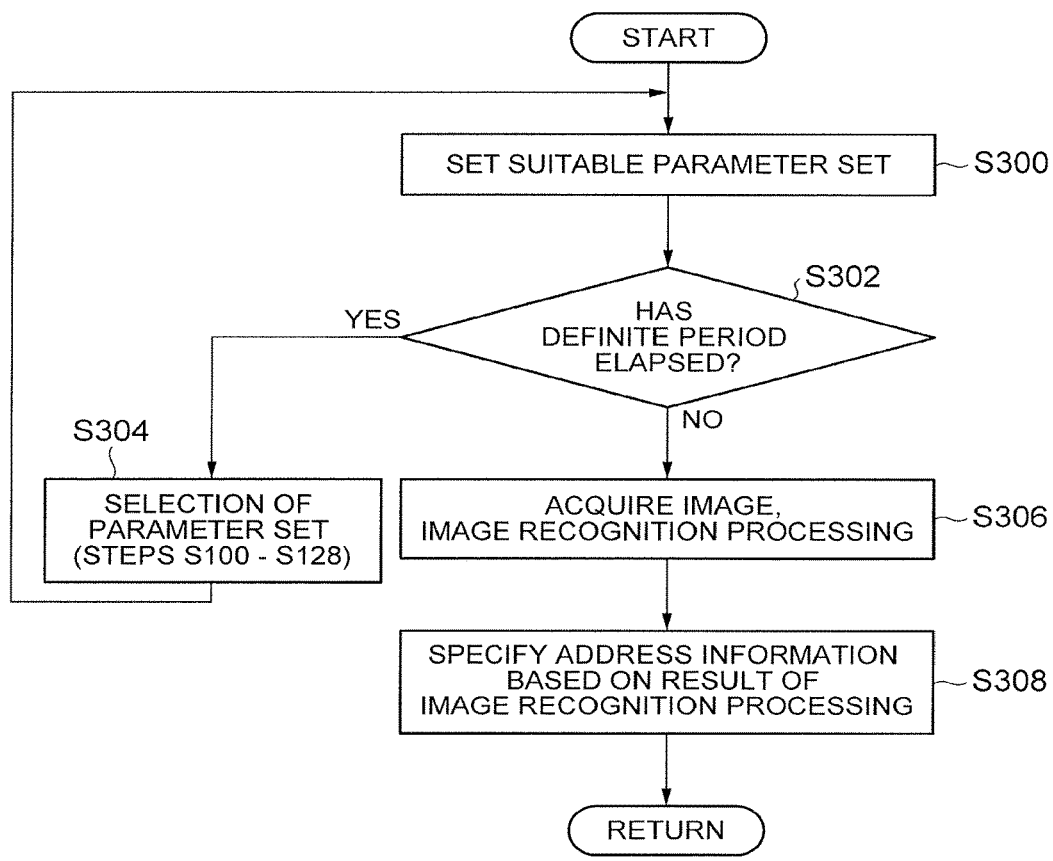
FIG. 17 is a flow chart showing a flow of a processing to be executed when the delivery object P is actually handled by the delivery handling apparatus 20, in the case in which the definite period is selected as the updating condition.

FIG. 17 is a flow chart showing a flow of a processing to be executed when the delivery object P is actually handled by the delivery handling apparatus 20, in the case in which the definite period is selected as the updating condition.

To begin with, the address recognition portion 22 sets a suitable parameter set (step S300). The suitable parameter set is the suitable parameter set which has been selected by the parameter set candidate selecting portion 28 in the above-described flow chart of FIG. 6, and has been outputted to the address recognition portion 22.

Next, the parameter set candidate selecting portion 28 determines whether or not a definite period elapsed after the suitable parameter set set in the processing of the step S300 was applied (step S302). In addition, in place of the definite period, whether or not a prescribed number or amount of the delivery objects P have been handled may be determined. When a definite period elapsed (an example of "a case in which the first prescribed condition is satisfied"), the processing proceeds to the processing of a step S304. In addition, in this case, the delivery handling apparatus 20 temporarily stops the processing in execution. The processing of the step S304 is a processing to select a suitable parameter set out of a plurality of the parameter set candidates stored in the storage portion 50 (the step S100 to the step S128 in FIG. 6).

When a definite period not elapsed, the control portion 31 makes the address recognition portion 22 acquires an image imaged by the imaging portion 14, and execute the image recognition processing to the acquired image (step S306). Next, the address specifying portion 26 specifies address information, based on the result of the image recognition processing (step S308). And the control portion 31 controls the sorting portion 19 to make the address specifying portion 26 sort the delivery object P into the sorting stacker, based on the specification result of the address information. By this means, the processing of one routine of the present flow chart is finished.

When "(2) definite period" is selected as the updating condition as described above, the parameter set candidate selecting portion 28 updates a parameter set for each definite period, and thereby it is possible to avoid in advance that the accuracy of the image recognition processing is decreased.

Figure 18:
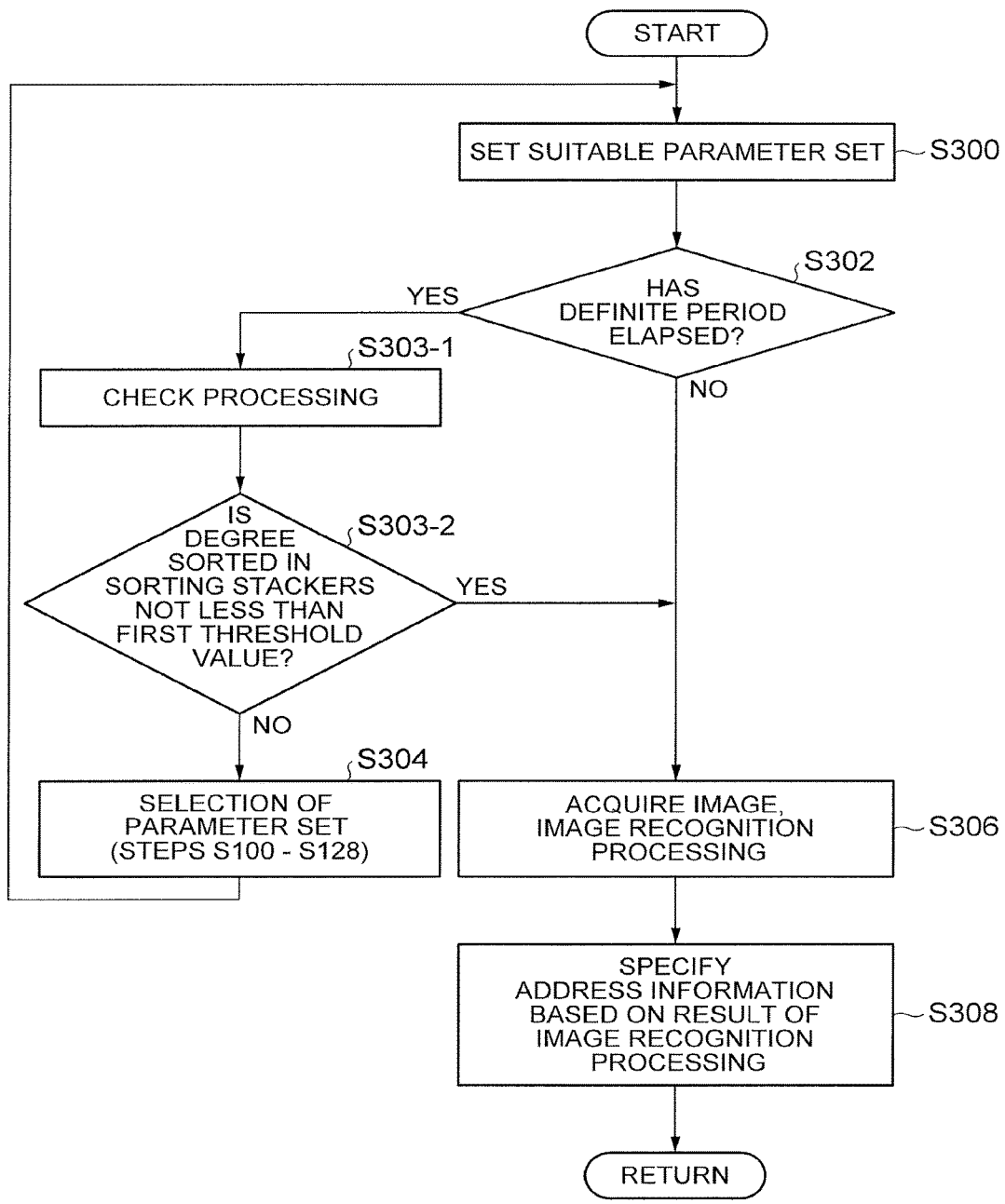
FIG. 18 is a flow chart showing another example of a flow of a processing to be executed when the delivery object P is actually handled by the delivery handling apparatus 20, in the case in which the definite period is selected as the updating condition.

FIG. 18 is a flow chart showing another example of a processing to be executed when the delivery object P is actually handled by the delivery handling apparatus 20, in the case in which the definite period is selected as the updating condition. Hereinafter, processings different from the processings of the flow chart shown in FIG. 17 will be described.

When a definite period elapsed in the step S302, the delivery handling apparatus 20 executes a check processing to determine whether or not the set parameter which has been set is suitable or not (step S303-1). The check processing is processings of (1)-(3) described below. (1) To begin with, the delivery handling apparatus 20 temporarily stops the processing in execution. (2) Next, the address recognition portion 22 newly acquires images of a prescribed number (100, for example) of the delivery objects P for testing, and executes an image recognition processing to the acquired images, using the parameter set which has been used before temporarily stopping the processing in execution. The control portion 31 control the sorting portion 19 to make the delivery objects P to be sorted into the sorting stackers corresponding to the specified addresses, based on the addresses specified in the image recognition processing, and makes the processing result to be stored in the storage portion 50. (3) Next, the evaluating portion 30 acquires the above-described processing result, and derives a degree in which the delivery objects P for testing have been sorted into the sorting stackers, based on the acquired processing result. And the higher the sorted degree is, the higher evaluation the evaluating portion 30 gives.

Next, the evaluating portion 30 determines whether or not the degree in which the delivery objects P for testing have been sorted into the sorting stackers is not less than a first threshold value (step S303-2). When the sorted degree is not less than the first threshold value, the processing proceeds to the processing of the step S306. In this case, the delivery handling apparatus 20 acquires an image of the delivery object P of the processing object, and starts the image recognition processing again, using the parameter set which has been used before the temporarily stopping. When the sorted degree is less than the first threshold value, the processing proceeds to the processing of the step S304.

In addition, the check processing of the step S303-1 may be performed based on a degree in which the delivery objects P have been sorted into the sorting stackers corresponding to the right addresses. In this case, in the step S303-2, whether or not the degree in which the delivery objects P have been sorted into the sorting stackers corresponding to the right addresses is not less than a second threshold value.

As described above, the delivery handling apparatus 20 executes the check processing, and when the result of the check processing does not satisfy the second prescribed condition, the delivery handling apparatus 20 executes a processing to select a suitable parameter set again, and thereby it is possible to suppress that a processing to select a suitable parameter set is uselessly performed.

Second Embodiment

Hereinafter, a second embodiment will be described. Each of delivery handling apparatuses 20A-1 to 20A-n in the second embodiment acquires information of the parameter set before and after the change from the other delivery handling apparatus, and updates the parameter set of the own apparatus, based on the acquired information. Hereinafter, a point different from the first embodiment will be mainly described.

Figures 19, 20:
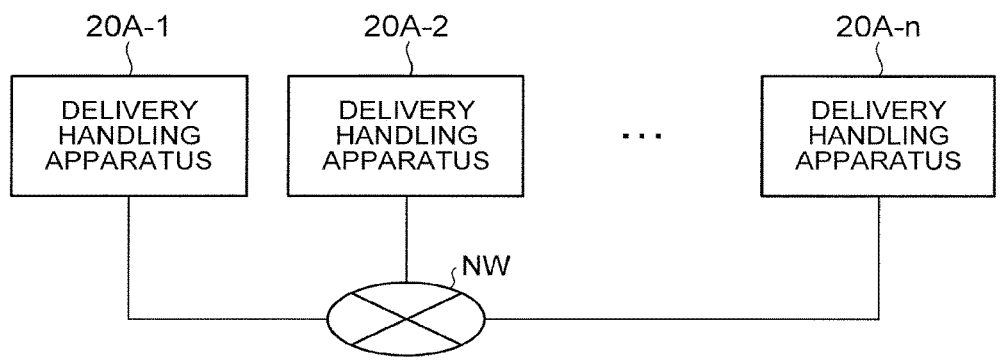
FIG. 19 is a diagram showing a configuration of a delivery handling system 1A of a second embodiment.
FIG. 20 is a diagram showing an example of a parameter set information table IT.

FIG. 19 is a diagram showing a configuration of a delivery handling system 1A of the second embodiment. The delivery handling system 1A includes the delivery handling apparatuses 20A-1 to 20A-n. The delivery handling apparatuses 20A-1 to 20A-n communicates with each other via the network NW. Hereinafter, the delivery handling apparatuses 20A-1 to 20A-n are referred to as delivery handling apparatuses 20A, when they are not to be discriminated from each other. The respective delivery handling apparatuses 20A may be installed in the same site, or may be installed in different sites.

Hereinafter, the description will be made by focusing on a processing to be executed between the delivery handling apparatus 20A-1 and the delivery handling apparatus 20A-2, as an example. When the suitable parameter set has been changed to another parameter set in the delivery handling apparatus 20A-1, the delivery handling apparatus 20A-1 transmits information (information indicating the parameter sets before and after the change) capable of comparing the suitable parameter set selected by the evaluating portion 30 with the suitable parameter set which has been selected before the suitable parameter set is selected, to the delivery handling apparatus 20A-2.

The cause in which the suitable parameter set has been changed to another parameter set is change of the environmental factor of the area where the delivery handling apparatus 20A is installed, for example. Since the result of the image recognition processing is changed by the environmental factor, the suitable parameter set before the environmental factor changes becomes unsuitable after the environmental factor changes. On the other hand, when a parameter set is changed without being caused by the change of the environmental factor, that is, from the parameter set A1-1 corresponding to A company 1 to the parameter set B1-1 corresponding to B company 1, the relevant information is not transmitted. However, the format and the element of the environmental factor are both changed, the relevant information is transmitted.

The delivery handling apparatus 20A-2 acquires the information of the parameter set before the change and the information of the parameter set after the change from the delivery handling apparatus 20A-1. The delivery handling apparatus 20A-2 recognizes the environmental factor in the delivery handling apparatus 20A-1, based on the information acquired from the delivery handling apparatus 20A-1 and a parameter set information table IT. In addition, the delivery handling apparatus 20A-2 may change the parameter set to a parameter set corresponding to the environmental factor, based on the information acquired from the delivery handling apparatus 20A-1 and the parameter set information table IT.

FIG. 20 is a diagram showing an example of the parameter set information table IT. The parameter set information table IT is stored in the storage portion 50 of the delivery handling apparatus 20A. FIG. 20 shows an example corresponding to change in the state of light in the area where the delivery handling apparatus 20A is arranged, as the environmental factor. In the parameter set information table IT, parameter sets are associated with combinations of the large customer format (for example, A company 1, A company 2, or B company 1) and the state of light (for example, light, intermediate, or dark).

The delivery handling apparatus 20A recognizes the environmental factor with which the other delivery handling apparatus 20A has changed the parameter set, or the parameter set which the own apparatus has to change, based on the information of the parameter set before the change and the information of the parameter set after the change which have been acquired from the other delivery handling apparatus 20A, and the parameter set information table IT.

For example, it is assumed that the delivery handling apparatus 20A-2 has acquired information indicating that the parameter set has been changed from the parameter set A1-1 to the parameter set A1-3 in the delivery handling apparatus 20A-1, for example. In this case, when the delivery handling apparatus 20A-2 performs a processing by applying the parameter set B1-1 to the large customer format "B company 1", for example, the delivery handling apparatus 20A-2 changes the parameter set from the applied parameter set B1-1 to the parameter set B1-3. By this means, the delivery handling apparatus 20A-2 can deal with the environmental factor of changing the parameter set in advance or rapidly.

In addition, in the above-described example, it has been assumed that the delivery handling apparatus 20A acquires the parameter sets before and after the change directly from the other delivery handling apparatus 20A, but a managing apparatus which manages information transmitted from the delivery handling apparatus 20A may transmit the parameter set before and after the change to the desired delivery handling apparatus 20A. The delivery handling apparatus 20A and the managing apparatus communicate with each other via the network NW.

For example, in a storage portion of the managing apparatus, association information is stored in which the identification information of the delivery handling apparatus 20A of the transmission source of the information, and the identification information of the delivery handling apparatus 20A of the transmission destination of the information are associated with each other. The managing apparatus transmits the information acquired from the delivery handling apparatus 20A of the transmission source to the delivery handling apparatus 20A of the transmission destination, based on this association information. In addition, the identification information of the delivery handling apparatuses 20A of the transmission source and the transmission destination may be associated with each other, in the association information, for each of the parameter sets before and after the updating.

For example, when the parameter set A1-1 is changed to the parameter set A1-2 by the delivery handling apparatus 20A-1, it is stored in the association information that the transmission destination of the information of the parameter sets before and after the change is the delivery handling apparatus 20A-2. In addition, when the parameter set A1-3 is changed to the parameter set A1-4 by the delivery handling apparatus 20A-1, it is stored in the association information that the transmission destination of the information of the parameter sets before and after the change is the delivery handling apparatus 20A-3. In addition, for example, it is stored in the association information that a transmission destination of information of the change of a parameter set in accordance with aged deterioration is the delivery handling apparatus 20A which is used to the same degree as the delivery handling apparatus 20A-1.

In this manner, the delivery handling apparatus 20A of the transmission destination can deal with the matter that accuracy of the image recognition processing decreases, by the same environmental factor as an environmental factor of changing the parameter set in the transmission source, in advance or rapidly.

Figure 21:
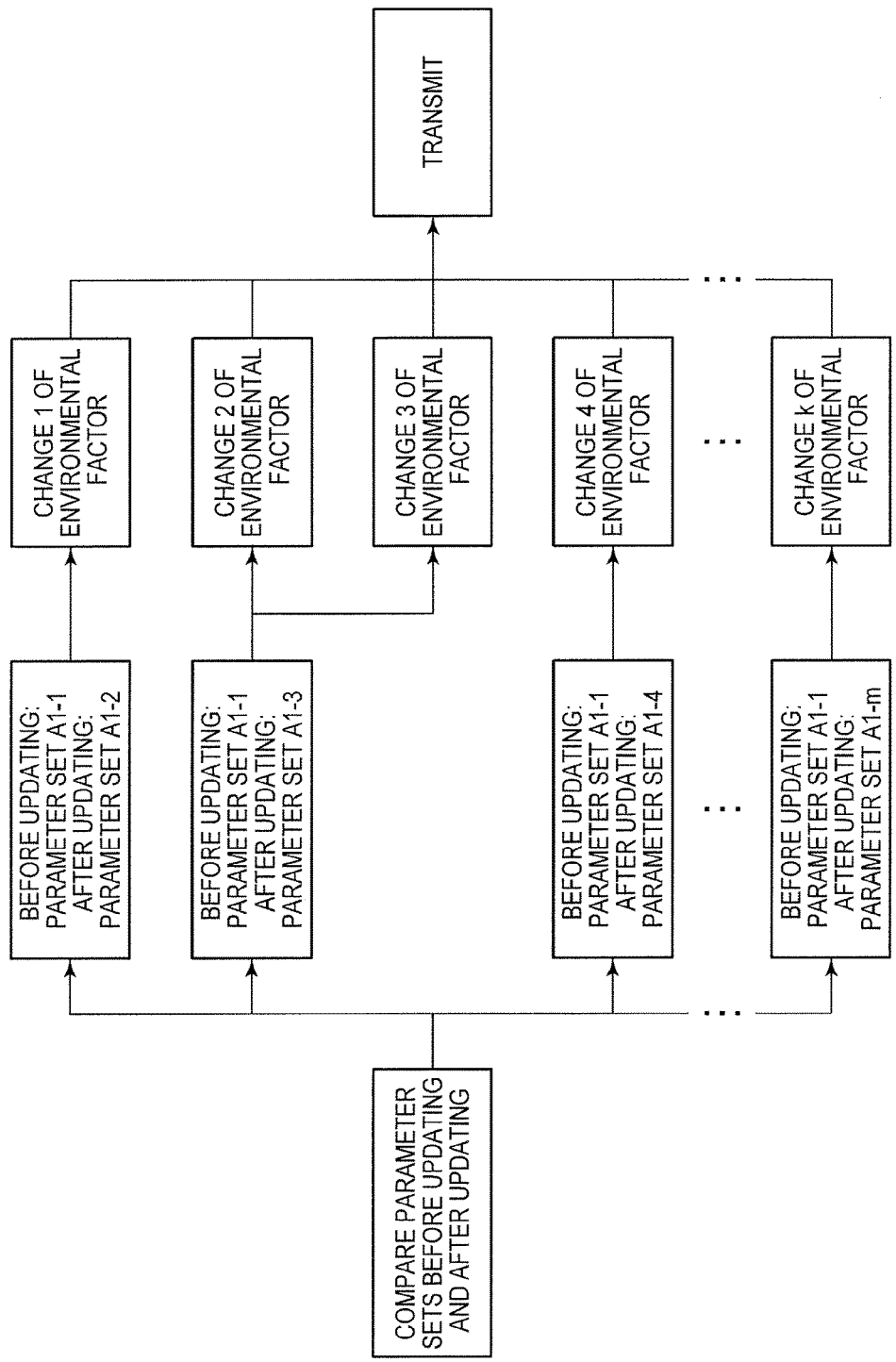
FIG. 21 is a conceptual diagram of a processing of transmitting the information of the environmental factor to the other delivery handling apparatus 20A.

In addition, the delivery handling apparatus 20A may transmit the information of the environmental factor to the other delivery handling apparatus 20A, in place of transmitting the information of the parameter sets before and after the updating. FIG. 21 is a conceptual diagram of a processing of transmitting information of an environmental factor to the other delivery handling apparatus 20A. In the drawing, "k" and "m" are arbitrary natural numbers. For example, in the storage portion 50 of the delivery handling apparatus 20A, environmental factor information is stored in which information relating to change of one or a plurality of environmental factors is associated with information of the parameter sets before and after the change.

The delivery handling apparatus 20A estimates change of an environmental factor to cause the parameter set to be changed, based on the information of the parameter sets before and after the updating, and the environmental factor information, and transmits the information relating to the change of the environmental factor that is the estimation result, to the other the delivery handling apparatus 20A. The other delivery handling apparatus 20A acquires the transmitted information relating to the change of the environmental factor. The other delivery handling apparatus 20A changes the parameter set, based on an information table, the acquired change of the environmental factor, the parameter set which has been set. The information table is information in which parameter sets before and after the change are associated with the change of an environmental factor.

In addition, it has been described, in the above-described example, that the delivery handling apparatus 20A handles the delivery object P of an large customer, but the delivery handling apparatus 20A may handle the delivery object P of a customer except a large customer. In addition, the delivery handling apparatus 20A which handles the delivery object P of a large customer, for example, may transmit information relating to the change of an environmental factor, and information of parameter sets before and after the updating, to the other delivery handling apparatus 20A which handles the delivery object P of a customer except a large customer. The other delivery handling apparatus 20A which handles the delivery object P of a customer except a large customer acquires this information, and may change a parameter set which is to be set in the image recognition processing, based on the acquired information.

According to the second embodiment as described above, the delivery handling apparatus 20A acquires the information of the parameter sets before and after the change, and the information relating to the change of an environmental factor from the other delivery handling apparatus 20A, and thereby can flexibly deal with the change of an environmental factor. For example, the delivery handling apparatus 20A can deal with the matter that accuracy of the image recognition processing decreases by the change of an environmental factor, in advance and rapidly.

According to at least one embodiment described above, a delivery handling apparatus has a parameter set selecting portion which sequentially selects parameter sets from a plurality of the parameter sets, and a recognition portion which performs an image recognition processing to an image with parameter sets selected by the parameter set selecting portion. And a parameter set selecting portion selects the parameter set satisfying a prescribed condition, based on a result of the image recognition processing corresponding to the respective parameter sets. Accordingly, it is possible to improve convenience for a user and recognition accuracy.

The embodiment as described above can be expressed as described below.

A delivery handling apparatus provided with
a recognition portion which recognizes information including an address given to an delivery object, from information obtained by performing OCR processing to an image imaged by an imaging portion to image the delivery object, using a prescribed parameter set, and
a parameter selecting portion which operates when an instruction to start a prescribed processing is made, or when the result of the OCR processing of the recognition portion does not satisfy a prescribed reference, and sequentially selects parameter sets from a plurality of the parameter sets which are previously stored in a storage portion and are to be used in the recognition portion, makes the recognition portion execute the OCR processing using the selected parameter sets, evaluates the result of the OCR processings corresponding to the respective parameter sets, and selects a suitable parameter set in which the evaluation result satisfies a predetermined condition.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A delivery handling apparatus, comprising:
   circuitry configured to implement
   a recognizer which performs an image recognition processing to an image imaged by an imager to image a delivery object, to recognize information including an address given to the delivery object;
   a parameter selector which sequentially selects parameter sets from a plurality of the parameter sets previously stored in a storage; and
   a controller which makes the parameter selector sequentially select the parameter sets from the plurality of the parameter sets, and the recognizer perform the image recognition processing to the image with the parameter sets selected, and the parameter selector select the parameter set satisfying a prescribed condition, based on a result of the image recognition processing corresponding to the respective parameter sets,
   wherein each of the parameter sets is associated with known feature information of an address description space in which address information is included, and the known feature information indicates a kind of a closing line that is the address description space, a size of the closing line, an aspect ratio of the closing line, an arrangement of the closing line, a kind of a mark, and an arrangement of the mark, and
   wherein each of the parameter sets further includes a threshold value in a binarization processing, a threshold value for determining success/unsuccess of character recognition, a threshold value for determining contrast which is adjusted in accordance with a change in contrasting density of a printed character or a described character, and a threshold value for determining a label size.

2. The delivery handling apparatus according to claim 1, wherein:
   the circuitry is configured to implement a sorter which sorts the delivery objects in sorting places out of a plurality of sorting places assigned to the respective addresses or a place different from the sorting places, when the addresses of the delivery objects have been specified in the image recognition processing, the sorter to sort the delivery objects in the sorting places corresponding to the specified address, and when the addresses of the delivery objects have not been specified in the image recognition processing controls the sorting portion to sort the delivery objects in the place different from the sorting places; and
   the parameter selector derives a degree in which the delivery objects have been sorted in the sorting places, when the degree is not less than a first threshold value, determine that the prescribed condition is satisfied.

3. The delivery handling apparatus according to claim 1, wherein:
   when the addresses of the delivery objects have been specified in the image recognition processing, the controller determines that the delivery objects can be sorted in sorting places out of a plurality of the sorting places assigned to the respective addresses, and when the addresses of the delivery objects have not been specified in the image recognition processing, the controller determines that the delivery objects cannot be sorted in the plurality of the sorting places;
   the parameter selector derives a degree in which the controller determines that the delivery objects can be sorted in the sorting places, when the degree is not less than a first threshold value, determine that the prescribed condition is satisfied.

4. The delivery handling apparatus according to claim 1, wherein:
   the parameter selector sequentially selects parameter sets from a plurality of the parameter sets each of which is associated with the known feature information having a feature similar to the address description space in the delivery object of a processing object.

5. The delivery handling apparatus according to claim 1, wherein:
   when the parameter selector has determined that any of a plurality of the parameter sets does not satisfy the prescribed condition, based on the result of the image recognition processing executed using a plurality of the parameter sets previously stored in the storage, the parameter selector individually changes a plurality of parameters included in the parameter set, to generate the parameter set satisfying the prescribed condition.

6. A delivery handling method to be executed by a computer of a delivery handling apparatus, comprising:
   sequentially selecting parameter sets from a plurality of the parameter sets stored in a storage;
   performing an image recognition processing to an image imaged by an imager to image a delivery object with the parameter sets selected;
   recognizing information including an address given to the delivery object; and
   selecting the parameter set satisfying a prescribed condition, based on a result of the image recognition processing corresponding to the respective parameter sets,
   wherein each of the parameter sets is associated with known feature information of an address description space in which address information is included, and the known feature information indicates a kind of a closing line that is the address description space, a size of the closing line, an aspect ratio of the closing line, an arrangement of the closing line, a kind of a mark, and an arrangement of the mark, and wherein each of the parameter sets further includes a threshold value in a binarization processing, a threshold value for determining success/unsuccess of character recognition, a threshold value for determining contrast which is adjusted in accordance with a change in contrasting density of a printed character or a described character, and a threshold value for determining a label size.

* * * * *